(12) United States Patent
Peng

(10) Patent No.: US 12,061,319 B2
(45) Date of Patent: Aug. 13, 2024

(54) CAMERA OPTICAL LENS

(71) Applicant: AAC Optics (Changzhou) Co., Ltd., Changzhou (CN)

(72) Inventor: Haichao Peng, Shenzhen (CN)

(73) Assignee: AAC OPTICS (CHANGZHOU) CO., LTD., Changzhou (CN)

( * ) Notice: Subject to any disclaimer, the term of this patent is extended or adjusted under 35 U.S.C. 154(b) by 743 days.

(21) Appl. No.: 17/131,776

(22) Filed: Dec. 23, 2020

(65) Prior Publication Data

US 2021/0364752 A1   Nov. 25, 2021

(30) Foreign Application Priority Data

May 25, 2020   (CN) .......................... 202010445651.7

(51) Int. Cl.
| | | |
|---|---|---|
| G02B 13/00 | (2006.01) | |
| G02B 1/04 | (2006.01) | |
| G02B 9/64 | (2006.01) | |
| G02B 13/06 | (2006.01) | |
| G02B 27/00 | (2006.01) | |

(52) U.S. Cl.
CPC ......... G02B 13/0045 (2013.01); G02B 1/041 (2013.01); G02B 9/64 (2013.01); G02B 13/06 (2013.01); G02B 27/0025 (2013.01)

(58) Field of Classification Search
CPC .............................. G02B 13/0045; G02B 9/64
See application file for complete search history.

(56) References Cited

U.S. PATENT DOCUMENTS

| | | | | |
|---|---|---|---|---|
| 7,457,045 | B2 * | 11/2008 | Fujisaki ......... | G02B 15/143507 |
| | | | | 359/716 |
| 11,573,405 | B2 * | 2/2023 | Li .............. | G02B 9/64 |
| 2021/0278632 | A1 * | 9/2021 | Wang ............ | G02B 27/0025 |
| 2021/0364756 | A1 * | 11/2021 | Zhang ........... | G02B 13/18 |

* cited by examiner

*Primary Examiner* — Christopher Stanford
(74) *Attorney, Agent, or Firm* — W&G Law Group

(57) ABSTRACT

A camera optical lens includes, from an object side to an image side, a first lens having a positive refractive power; a second lens having a negative refractive power; a third lens having a positive refractive power; a fourth lens; a fifth lens having a negative refractive power; a sixth lens; a seventh lens having a positive refractive power; and an eighth lens having a negative refractive power. The camera optical lens satisfies: $1.50 \leq f7/f \leq 4.00$, $1.20 \leq R6/R5 \leq 5.00$ and $1.00 \leq d10/d12 \leq 3.50$, where f denotes a focal length of the camera optical lens, f7 denotes a focal length of the seventh lens, R5 denotes a curvature radius of an object-side surface of the third lens, and R6 denotes a curvature radius of an image-side surface of the third lens. The camera optical lens can achieve good optical performance while satisfying design requirements for ultra-thin, wide-angle lenses having large apertures.

10 Claims, 9 Drawing Sheets

CAMERA OPTICAL LENS

TECHNICAL FIELD

The present disclosure relates to the field of optical lens, and more particularly, to a camera optical lens suitable for handheld terminal devices, such as smart phones or digital cameras, and suitable for camera devices, such as monitors or PC lenses.

BACKGROUND

With the emergence of smart phones in recent years, the demand for miniature camera optical lens is increasingly higher, but in general the photosensitive devices of camera optical lens are nothing more than charge coupled devices (CCDs) or complementary metal-oxide semiconductor sensors (CMOS sensors). As the progress of the semiconductor manufacturing technology makes the pixel size of the photosensitive devices become smaller, plus the current development trend of electronic products towards better functions and thinner and smaller dimensions, miniature camera optical lenses with good imaging quality have become a mainstream in the market.

In order to obtain better imaging quality, the lens that is traditionally equipped in mobile phone cameras adopts a three-piece, four-piece, even five-piece or six-piece lens structure. However, with the development of technology and the increase of the diverse demands of users, and as the pixel area of photosensitive devices is becoming smaller and smaller and the requirement of the system on the imaging quality is becoming increasingly higher, an eight-piece lens structure gradually emerges in lens designs. Although the common eight-piece lens has good optical performance, its refractive power, lens spacing and lens shape settings still have some irrationality, such that the lens structure cannot achieve good optical performance while satisfying design requirements for ultra-thin, wide-angle lenses having large apertures.

SUMMARY

In view of the problems, the present disclosure aims to provide a camera optical lens, which can achieve high optical performance while satisfying design requirements for ultra-thin, wide-angle lenses having large apertures.

In an embodiment, the present disclosure provides a camera optical lens. The camera optical lens sequentially includes a first lens, a second lens, a third lens, a fourth lens, a fifth lens, a sixth lens, a seventh lens, and an eighth lens that are sequentially arranged from an object side to an image side. Each of the first lens, the third lens, and the seventh lens has a positive refractive power, and each of the second lens, the fifth lens and the eighth lens has a negative refractive power. The camera optical lens satisfies: $1.50 \leq f7/f \leq 4.00$; $1.20 \leq R6/R5 \leq 5.00$; and $1.00 \leq d10/d12 \leq 3.50$, where f denotes a focal length of the camera optical lens; f7 denotes a focal length of the seventh lens; R5 denotes a curvature radius of an object-side surface of the third lens; R6 denotes a curvature radius of an image-side surface of the third lens; d10 denotes an on-axis distance from an image-side surface of the fifth lens to an object-side surface of the sixth lens; and d12 denotes an on-axis distance from an image-side surface of the sixth lens to an object-side surface of the seventh lens.

As an improvement, the camera optical lens satisfies: $-4.50 \leq f2/f \leq -2.00$, where f2 denotes a focal length of the second lens.

As an improvement, the camera optical lens satisfies: $0.42 \leq f1/f \leq 1.55$, $-5.02 \leq (R1+R2)/(R1-R2) \leq -1.12$, and $0.06 \leq d1/TTL \leq 0.22$, where f1 denotes a focal length of the first lens; R1 denotes a curvature radius of an object-side surface of the first lens; R2 denotes a curvature radius of an image-side surface of the first lens; d1 denotes an on-axis thickness of the first lens; and TTL denotes a total optical length from the object-side surface of the first lens to an image plane of the camera optical lens along an optic axis.

As an improvement, the camera optical lens satisfies: $1.97 \leq (R3+R4)/(R3-R4) \leq 13.97$ and $0.02 \leq d3/TTL \leq 0.05$, where R3 denotes a curvature radius of an object-side surface of the second lens; R4 denotes a curvature radius of an image-side surface of the second lens; d3 denotes an on-axis thickness of the second lens; and TTL denotes a total optical length from an object-side surface of the first lens to an image plane of the camera optical lens along an optic axis.

As an improvement, the camera optical lens satisfies: $1.74 \leq f3/f \leq 15.48$, $-16.48 \leq (R5+R6)/(R5-R6) \leq -1.01$ and $0.02 \leq d5/TTL \leq 0.09$, where f3 denotes a focal length of the third lens; d5 denotes an on-axis thickness of the third lens; and TTL denotes a total optical length from an object-side surface of the first lens to an image plane of the camera optical lens along an optic axis.

As an improvement, the camera optical lens satisfies: $-123.82 \leq f4/f \leq 525.94$, $-152.84 \leq (R7+R8)/(R7-R8) \leq 13.30$ and $0.02 \leq d7/TTL \leq 0.07$, where f4 denotes a focal length of the fourth lens; R7 denotes a curvature radius of an object-side surface of the fourth lens; R8 denotes a curvature radius of an image-side surface of the fourth lens; d7 denotes an on-axis thickness of the fourth lens; and TTL denotes a total optical length from an object-side surface of the first lens to an image plane of the camera optical lens along an optic axis.

As an improvement, the camera optical lens satisfies: $-31.69 \leq f5/f \leq -3.66$, $1.41 \leq (R9+R10)/(R9-R10) \leq 11.67$, and $0.02 \leq d9/TTL \leq 0.07$, where f5 denotes a focal length of the fifth lens; R9 denotes a curvature radius of an object-side surface of the fifth lens; R10 denotes a curvature radius of an image-side surface of the fifth lens; d9 denotes an on-axis thickness of the fifth lens; and TTL denotes a total optical length from an object-side surface of the first lens to an image plane of the camera optical lens along an optic axis.

As an improvement, the camera optical lens satisfies: $-254.53 \leq f6/f \leq 83.40$, $-99.88 \leq (R11+R12)/(R11-R12) \leq 67.30$, and $0.03 \leq d11/TTL \leq 0.10$, where f6 denotes a focal length of the sixth lens; R11 denotes a curvature radius of an object-side surface of the sixth lens; R12 denotes a curvature radius of the image-side surface of the sixth lens; d11 denotes an on-axis thickness of the sixth lens; and TTL denotes a total optical length from an object-side surface of the first lens to an image plane of the camera optical lens along an optic axis.

As an improvement, the camera optical lens satisfies: $-10.05 \leq (R13+R14)/(R13-R14) \leq -1.29$ and $0.04 \leq d13/TTL \leq 0.14$, where R13 denotes a curvature radius of an object-side surface of the seventh lens; R14 denotes a curvature radius of an image-side surface of the seventh lens; d13 denotes an on-axis thickness of the seventh lens; and TTL denotes a total optical length from an object-side surface of the first lens to an image plane of the camera optical lens along an optic axis.

As an improvement, the camera optical lens satisfies: $-1.63 \leq f8/f \leq -0.44$, $-0.25 \leq (R15+R16)/(R15-R16) \leq 0.88$ and $0.03 \leq d15/TTL \leq 0.12$, where f8 denotes a focal length of the eighth lens; R15 denotes a curvature radius of an object-side surface of the eighth lens; R16 denotes a curvature radius of an image-side surface of the eighth lens; d15 denotes an on-axis thickness of the eighth lens; and TTL denotes a total optical length from an object-side surface of the first lens to an image plane of the camera optical lens along an optic axis.

As an improvement, the first lens is made of a glass material.

The camera optical lens according to the present disclosure has excellent optical characteristics and is ultra-thin and has a wide-angle and a large aperture, making it especially suitable for camera optical lens assembly of mobile phones and WEB camera optical lenses formed by camera elements for high-pixel such as CCD and CMOS.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment 1

Figure 1:
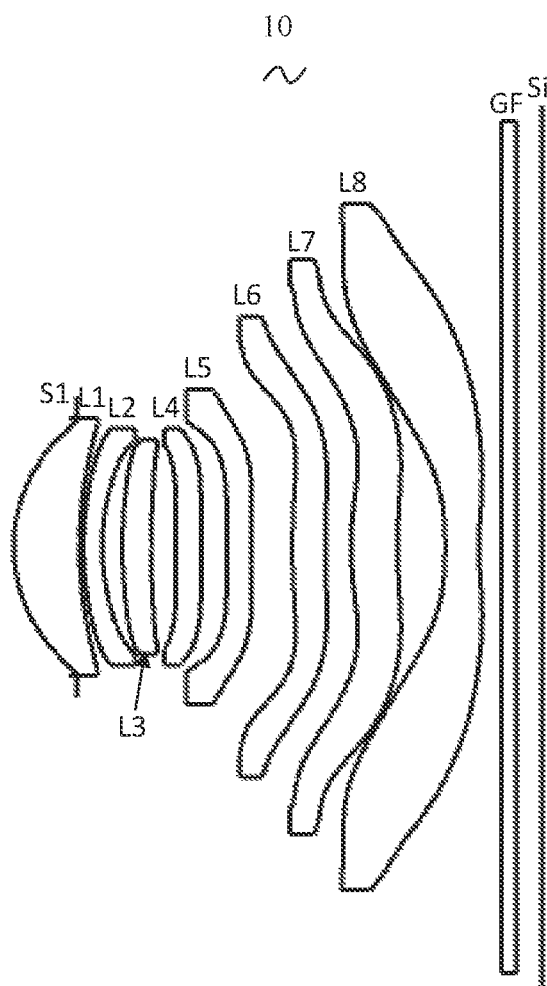
FIG. 1 is a schematic diagram of a structure of a camera optical lens in accordance with Embodiment 1 of the present disclosure.

Referring to FIG. 1, the present disclosure provides a camera optical lens 10. FIG. 1 shows the camera optical lens 10 according to Embodiment 1 of the present disclosure. The camera optical lens 10 includes eight lenses. Specifically, the camera optical lens 10 includes an aperture S1, a first lens L1, a second lens L2, a third lens L3, a fourth lens L4, a fifth lens L5, a sixth lens L6, a seventh lens L7 and an eighth lens L8 that are sequentially arranged from an object side to an image side. An optical element such as a glass filter (GF) can be arranged between the eighth lens L8 and an image plane Si.

As an example, the first lens L1 is made of a plastic material, the second lens L2 is made of a plastic material, the third lens L3 is made of a plastic material, the fourth lens L4 is made of a plastic material, the fifth lens L5 is made of a plastic material, the sixth lens L6 is made of a plastic material, the seventh lens L7 is made of a plastic material, and the eighth lens L8 is made of a plastic material.

The first lens L1 has a positive refractive power, the second lens L2 has a negative refractive power, the third lens L3 has a positive refractive power, the fourth lens L4 has a positive refractive power, the fifth lens L5 has a negative refractive power, the sixth lens L6 has a positive refractive power, the seventh lens L7 has a positive refractive power, and the eighth lens L8 has a negative refractive power A focal length of the camera optical lens 10 is defined as f, and a focal length of the seventh lens L7 is defined as f7. The camera optical lens 10 satisfies a condition of $1.50 \leq f7/f \leq 4.00$, which specifies a ratio of the focal length f7 of the seventh lens L7 to the focal length f. This condition facilitates correction of field curvature and improves the imaging quality.

A curvature radius of an object-side surface of the third lens L3 is defined as R5, and a curvature radius of an image-side surface of the third lens L3 is defined as R6. The camera optical lens 10 satisfies a condition of $1.20 \leq R6/R5 \leq 5.00$, which specifies a shape of the third lens L3. This condition can alleviate deflection degree of light passing through the lens while effectively reducing aberrations.

An on-axis distance from an image-side surface of the fifth lens L5 to an object-side surface of the sixth lens L6 is defined as d10, and an on-axis distance from an image-side surface of the sixth lens L6 to an object-side surface of the seventh lens L7 is defined as d12. The camera optical lens 10 satisfies a condition of $1.00 \leq d10/d12 \leq 3.50$. When d10/d12 satisfies the condition, a position of the sixth lens L6 can be distributed effectively, which improves the imaging quality.

As an example, the focal length of the camera optical lens 10 is f, a focal length of the second lens L2 is f2, and the camera optical lens 10 satisfies a condition of $-4.50 \leq f2/f \leq -2.00$, which specifies a ratio of the focal length f2 of the second lens L2 to the focal length f of the system. This condition can improve the performance of the optical system.

The first lens L1 includes an object-side surface being convex in a paraxial region and an image-side surface being concave in the paraxial region.

As an example, a focal length of the camera optical lens 10 is defined as f, a focal length of the first lens L1 is defined as f1, and the camera optical lens 10 satisfies a condition of $0.42 \leq f1/f \leq 1.55$, which specifies a ratio of the focal length f1 of the first lens L1 to the focal length f of the camera optical lens 10. When the condition is satisfied, the first lens L1 can have an appropriate positive refractive power, thereby facilitating reducing aberrations of the system while facilitating development towards ultra-thin, wide-angle lenses. As an example, $0.67 \leq f1/f \leq 1.24$.

As an example, a curvature radius of the object-side surface of the first lens L1 is defined as R1, a curvature radius of the image-side surface of the first lens L1 is defined as R2, and the camera optical lens 10 satisfies a condition of $-5.02 \leq (R1+R2)/(R1-R2) \leq -1.12$. This can reasonably control a shape of the first lens L1, so that the first lens L1 can effectively correct spherical aberrations of the system. As an example, $-3.13 \leq (R1+R2)/(R1-R2) \leq -1.40$.

As an example, an on-axis thickness of the first lens L1 is defined as d1, a total optical length from the object-side surface of the first lens L1 to an image plane of the camera optical lens 10 along an optic axis is defined as TTL, and the camera optical lens 10 satisfies a condition of $0.06 \leq d1/TTL \leq 0.22$. This can facilitate achieving ultra-thin lenses. As an example, $0.10 \leq d1/TTL \leq 0.17$.

The second lens L2 includes an object-side surface being convex in a paraxial region and an image-side surface being concave in the paraxial region.

As an example, a curvature radius of the object-side surface of the second lens L2 is defined as R3, a curvature radius of the image-side surface of the second lens L2 is defined as R4, and the camera optical lens 10 satisfies a condition of $1.97 \leq (R3+R4)/(R3-R4) \leq 13.97$, which specifies a shape of the second lens L2. This can facilitate correction of an on-axis aberration with development towards ultra-thin lenses. As an example, $3.15 \leq (R3+R4)/(R3-R4) \leq 11.18$.

As an example, an on-axis thickness of the second lens L2 is defined as d3, the total optical length from the object-side surface of the first lens L1 to an image plane of the camera optical lens 10 along an optic axis is defined as TTL, and the camera optical lens 10 satisfies a condition of $0.02 \leq d3/TTL \leq 0.05$. This can facilitate achieving ultra-thin lenses. As an example, $0.03 \leq d3/TTL \leq 0.04$.

The third lens L3 includes the object-side surface being convex in a paraxial region and the image-side surface being concave in the paraxial region.

As an example, the focal length of the camera optical lens 10 is f, a focal length of the third lens L3 is f3, and the camera optical lens 10 satisfies a condition of $1.74 \leq f3/f \leq 15.48$. The appropriate distribution of the refractive power leads to better imaging quality and a lower sensitivity. As an example, $2.79 \leq f3/f \leq 12.39$.

As an example, a curvature radius of the object-side surface of the third lens L3 is defined as R5, and a curvature radius of the image-side surface of the third lens L3 is defined as R6. The camera optical lens 10 satisfies a condition of $-16.48 \leq (R5+R6)/(R5-R6) \leq -1.01$, which specifies a shape of the third lens. This condition can alleviate the deflection of light passing through the lens while effectively reducing aberrations. As an example, $-10.30 \leq (R5+R6)/(R5-R6) \leq -1.26$.

An on-axis thickness of the third lens L3 is defined as d5, and the total optical length from the object-side surface of the first lens L1 to an image plane of the camera optical lens 10 along an optic axis is defined as TTL. The camera optical lens 10 satisfies a condition of $0.02 \leq d5/TTL \leq 0.09$. This can facilitate achieving ultra-thin lenses. As an example, $0.04 \leq d5/TTL \leq 0.07$.

The fourth lens L4 includes an object-side surface being convex in a paraxial region and an image-side surface being concave in the paraxial region.

As an example, the focal length of the camera optical lens 10 is f, a focal length of the fourth lens L4 is f4, and the camera optical lens 10 satisfies a condition of $-123.82 \leq f4/f \leq 525.94$, which specifies a ratio of the focal length f4 of the fourth lens L4 to the focal length f of the system. This condition facilitates to improve the performance of the optical system. As an example, $-77.39 \leq f4/f \leq 420.75$.

As an example, a curvature radius of the object-side surface of the fourth lens L4 is defined as R7, a curvature radius of the image-side surface of the fourth lens L4 is defined as R8, and the camera optical lens 10 satisfies a condition of $-152.84 \leq (R7+R8)/(R7-R8) \leq 13.30$, which specifies a shape of the fourth lens L4. This can facilitate correction of an off-axis aberration with development towards ultra-thin lenses. As an example, $-95.52 \leq (R7+R8)/(R7-R8) \leq 10.64$.

As an example, an on-axis thickness of the fourth lens L4 is defined as d7, the total optical length from the object-side surface of the first lens L1 to an image plane of the camera optical lens 10 along an optic axis is defined as TTL, and the camera optical lens 10 satisfies a condition of $0.02 \leq d7/TTL \leq 0.07$. This can facilitate achieving ultra-thin lenses. As an example, $0.04 \leq d7/TTL \leq 0.06$.

The fifth lens L5 includes an object-side surface being convex in a paraxial region and an image-side surface being concave in the paraxial region.

As an example, the focal length of the camera optical lens 10 is f, a focal length of the fifth lens L5 is f5, and the camera optical lens 10 satisfies a condition of $-31.69 \leq f5/f \leq -3.66$. This condition can effectively make a light angle of the camera optical lens 10 gentle and reduce the tolerance sensitivity. As an example, $-19.80 \leq f5/f \leq -4.58$.

As an example, a curvature radius of the object-side surface of the fifth lens L5 is defined as R9, a curvature radius of the image-side surface of the fifth lens L5 is defined as R10, and the camera optical lens 10 satisfies a condition of $1.41 \leq (R9+R10)/(R9-R10) \leq 11.67$, which specifies a shape of the fifth lens L5. This can facilitate correction of an off-axis aberration with development towards ultra-thin lenses. As an example, $2.26 \leq (R9+R10)/(R9-R10) \leq 9.33$.

As an example, an on-axis thickness of the fifth lens L5 is defined as d9, the total optical length from the object-side surface of the first lens L1 to an image plane of the camera optical lens 10 along an optic axis is defined as TTL, and the camera optical lens 10 satisfies a condition of $0.02 \leq d9/TTL \leq 0.07$. This can facilitate achieving ultra-thin lenses. As an example, $0.04 \leq d9/TTL \leq 0.06$.

The sixth lens L6 includes an object-side surface being convex in a paraxial region and an image-side surface being concave in the paraxial region.

As an example, the focal length of the camera optical lens 10 is f, a focal length of the sixth lens L6 is f6, and the camera optical lens 10 satisfies a condition of $-254.53 \leq f6/f \leq 83.40$. The appropriate distribution of the refractive power leads to better imaging quality and a lower sensitivity. As an example, $-159.08 \leq f6/f \leq 66.72$.

As an example, a curvature radius of the object-side surface of the sixth lens L6 is defined as R11, a curvature radius of the image-side surface of the sixth lens L6 is defined as R12, and the camera optical lens 10 satisfies a condition of −99.88≤(R11+R12)/(R11−R12)≤67.30, which specifies a shape of the sixth lens L6. This can facilitate correction of an off-axis aberration with development towards ultra-thin lenses. As an example, −62.42≤(R11+R12)/(R11−R12)≤53.84.

An on-axis thickness of the sixth lens L6 is defined as d11, and the total optical length from the object-side surface of the first lens L1 to an image plane of the camera optical lens 10 along an optic axis is defined as TTL. The camera optical lens 10 satisfies a condition of 0.03≤d11/TTL≤0.10. This can facilitate achieving ultra-thin lenses. As an example, 0.05≤d11/TTL≤0.08.

The seventh lens L7 includes an object-side surface being convex in a paraxial region and an image-side surface being concave in the paraxial region.

As an example, a curvature radius of the object-side surface of the seventh lens L7 is defined as R13, a curvature radius of the image-side surface of the seventh lens L7 is defined as R14, and the camera optical lens 10 satisfies a condition of −10.05≤(R13+R14)/(R13−R14)≤−1.29, which specifies a shape of the seventh lens L7. This can facilitate correction of an off-axis aberration with development towards ultra-thin, wide-angle lenses. As an example, −6.28≤(R13+R14)/(R13−R14)≤−1.61.

As an example, an on-axis thickness of the seventh lens L7 is defined as d13, the total optical length from the object-side surface of the first lens L1 to an image plane of the camera optical lens 10 along an optic axis is defined as TTL, and the camera optical lens 10 satisfies a condition of 0.04≤d13/TTL≤0.14. This condition can facilitate achieving ultra-thin lenses. As an example, 0.07≤d13/TTL≤0.11.

The eighth lens L8 includes an object-side surface being concave in a paraxial region and an image-side surface being concave in the paraxial region.

As an example, the focal length of the camera optical lens 10 is defined as f, a focal length of the eighth lens L8 is defined as f8, and the camera optical lens 10 satisfies a condition of −1.63≤f8/f≤−0.44. Through reasonable distribution of the refractive power, the system can have a better imaging quality and a lower sensitivity. As an example, −1.02≤f8/f≤−0.54.

As an example, a curvature radius of the object-side surface of the eighth lens L8 is defined as R15, a curvature radius of the image-side surface of the eighth lens L8 is defined as R16, and the camera optical lens 10 satisfies a condition of −0.25≤(R15+R16)/(R15−R16)≤0.88, which specifies a shape of the eighth lens L8. This can facilitate correction of an off-axis aberration with development towards ultra-thin, wide-angle lenses. As an example, −0.15≤(R15+R16)/(R15−R16)≤0.70.

As an example, an on-axis thickness of the eighth lens L8 is defined as d15, the total optical length from the object-side surface of the first lens L1 to an image plane of the camera optical lens 10 along an optic axis is defined as TTL, and the camera optical lens 10 satisfies a condition of 0.03≤d15/TTL≤0.12. This condition can facilitate achieving ultra-thin lenses. As an example, 0.05≤d15/TTL≤0.10.

In this embodiment, an image height of the camera optical lens 10 is defined as IH, and the total optical length from the object-side surface of the first lens L1 to an image plane of the camera optical lens 10 along an optic axis is defined as TTL. The camera optical lens 10 satisfies a condition of TTL/IH≤1.26. This condition can facilitate achieving ultra-thin lenses.

As an example, an F number FNO of the camera optical lens 10 is smaller than or equal to 1.80, thereby leading to a large aperture and high imaging performance.

As an example, a field of view (FOV) of the camera optical lens 10 is greater than or equal to 80°, thereby achieving the wide-angle performance.

As an example, the focal length of the camera optical lens 10 is defined as f, a combined focal length of the first lens L1 and the second lens L2 as defined as f12, and the camera optical lens 10 satisfies a condition of 0.57≤f12/f≤1.91. This can eliminate aberration and distortion of the camera optical lens 10, suppress the back focal length of the camera optical lens 10, and maintain miniaturization of the camera lens system group. As an example, 0.91≤f12/f≤1.53.

When the above conditions are satisfied, the camera optical lens 10 will have good optical performance while satisfying design requirements for ultra-thin, wide-angle lenses having large apertures. With these characteristics, the camera optical lens 10 is especially suitable for camera optical lens assembly of mobile phones and WEB camera optical lenses formed by imaging elements for high pixel such as CCD and CMOS.

In the following, examples will be used to describe the camera optical lens 10 of the present disclosure. The symbols recorded in each example will be described as follows. The focal length, on-axis distance, curvature radius, on-axis thickness, inflexion point position, and arrest point position are all in units of mm.

TTL: Optical length (the total optical length from the object-side surface of the first lens L1 to the image plane of the camera optical lens along the optic axis), in a unit of mm.

F number (FNO): a ratio of an effective focal length of the camera optical lens to an entrance pupil diameter of the camera optical lens.

In an example, inflexion points and/or arrest points can be arranged on the object-side surface and/or image-side surface of the lens, so as to satisfy the demand for the high quality imaging. The description below can be referred to for specific implementations.

Table 1 and Table 2 shows design data of the camera optical lens 10 according to Embodiment 1 of the present disclosure.

TABLE 1

|  | R |  | d | nd |  | vd |
|---|---|---|---|---|---|---|
| S1 | ∞ | d0= | −0.864 |  |  |  |
| R1 | 2.244 | d1= | 0.891 | nd1 | 1.5267 v1 | 76.60 |
| R2 | 5.221 | d2= | 0.054 |  |  |  |
| R3 | 4.044 | d3= | 0.260 | nd2 | 1.6700 v2 | 19.39 |
| R4 | 3.260 | d4= | 0.275 |  |  |  |
| R5 | 6.794 | d5= | 0.391 | nd3 | 1.5444 v3 | 55.82 |
| R6 | 11.509 | d6= | 0.336 |  |  |  |
| R7 | 37.785 | d7= | 0.340 | nd4 | 1.5661 v4 | 37.71 |
| R8 | 38.787 | d8= | 0.347 |  |  |  |
| R9 | 25.456 | d9= | 0.340 | nd5 | 1.6153 v5 | 25.94 |
| R10 | 16.101 | d10= | 0.556 |  |  |  |
| R11 | 9.841 | d11= | 0.450 | nd6 | 1.5661 v6 | 37.70 |
| R12 | 14.395 | d12= | 0.349 |  |  |  |
| R13 | 4.532 | d13= | 0.635 | nd7 | 1.5346 v7 | 55.69 |
| R14 | 9.772 | d14= | 0.642 |  |  |  |
| R15 | −6.388 | d15= | 0.462 | nd8 | 1.5444 v8 | 55.82 |
| R16 | 4.333 | d16= | 0.300 |  |  |  |
| R17 | ∞ | d17= | 0.210 | ndg | 1.5170 vg | 64.20 |
| R18 | ∞ | d18= | 0.354 |  |  |  |

In the table, meanings of various symbols will be described as follows.

S1: aperture;
R: central curvature radius for a lens;
R1: curvature radius of the object-side surface of the first lens L1;
R2: curvature radius of the image-side surface of the first lens L1;
R3: curvature radius of the object-side surface of the second lens L2;
R4: curvature radius of the image-side surface of the second lens L2;
R5: curvature radius of the object-side surface of the third lens L3;
R6: curvature radius of the image-side surface of the third lens L3;
R7: curvature radius of the object-side surface of the fourth lens L4;
R8: curvature radius of the image-side surface of the fourth lens L4;
R9: curvature radius of the object-side surface of the fifth lens L5;
R10: curvature radius of the image-side surface of the fifth lens L5;
R11: curvature radius of the object-side surface of the sixth lens L6;
R12: curvature radius of the image-side surface of the sixth lens L6;
R13: curvature radius of the object-side surface of the seventh lens L7;
R14: curvature radius of the image-side surface of the seventh lens L7;
R15: curvature radius of the object-side surface of the eighth lens L8;
R16: curvature radius of the image-side surface of the eighth lens L8;
R17: curvature radius of an object-side surface of the optical filter GF;
R18: curvature radius of an image-side surface of the optical filter GF;
d: on-axis thickness of a lens and an on-axis distance between lenses;
d0: on-axis distance from the aperture S1 to the object-side surface of the first lens L1;
d1: on-axis thickness of the first lens L1;
d2: on-axis distance from the image-side surface of the first lens L1 to the object-side surface of the second lens L2;
d3: on-axis thickness of the second lens L2;
d4: on-axis distance from the image-side surface of the second lens L2 to the object-side surface of the third lens L3;
d5: on-axis thickness of the third lens L3;
d6: on-axis distance from the image-side surface of the third lens L3 to the object-side surface of the fourth lens L4;
d7: on-axis thickness of the fourth lens L4;
d8: on-axis distance from the image-side surface of the fourth lens L4 to the object-side surface of the fifth lens L5;
d9: on-axis thickness of the fifth lens L5;
d10: on-axis distance from the image-side surface of the fifth lens L5 to the object-side surface of the sixth lens L6;
d11: on-axis thickness of the sixth lens L6;
d12: on-axis distance from the image-side surface of the sixth lens L6 to the object-side surface of the seventh lens L7;
d13: on-axis thickness of the seventh lens L7;
d14: on-axis distance from the image-side surface of the seventh lens L7 to the object-side surface of the eighth lens L8;
d15: on-axis thickness of the eighth lens L8;
d16: on-axis distance from the image-side surface of the eighth lens L8 to the object-side surface of the optical filter GF;
d17: on-axis thickness of the optical filter GF;
d18: on-axis distance from the image-side surface of the optical filter GF to the image plane;
nd: refractive index of d line (the d-line is green light with a wavelength of 550 nm);
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
nd7: refractive index of d line of the seventh lens L7;
nd8: refractive index of d line of the eighth lens L8;
ndg: refractive index of d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7;
v8: abbe number of the eighth lens L8;
vg: abbe number of the optical filter GF.

Table 2 shows aspherical data of respective lens in the camera optical lens 10 according to Embodiment 1 of the present disclosure.

TABLE 2

| | Conic coefficient | Aspherical coefficients | | | | |
|---|---|---|---|---|---|---|
| | k | A4 | A6 | A8 | A10 | A12 |
| R1 | −1.2892E−01 | 1.9301E−03 | −1.1385E−03 | 5.0150E−03 | −7.7113E−03 | 6.6606E−03 |
| R2 | −1.5815E+01 | −1.3388E−02 | 3.4502E−02 | −4.1295E−02 | 3.6311E−02 | −2.2610E−02 |
| R3 | −1.6797E+00 | −3.3795E−02 | 4.4159E−02 | −4.8224E−02 | 4.6432E−02 | −3.2079E−02 |
| R4 | −2.2144E+00 | −7.1298E−03 | 2.1107E−02 | −2.6211E−02 | 3.7786E−02 | −3.8148E−02 |
| R5 | 1.5386E+01 | −1.3439E−02 | 9.1601E−03 | −2.9092E−02 | 5.6341E−02 | −6.5219E−02 |
| R6 | 5.7600E+01 | −1.4783E−02 | 5.5003E−03 | −1.5843E−02 | 2.2841E−02 | −1.9223E−02 |
| R7 | 2.7868E+01 | −2.9235E−02 | 7.6349E−03 | −2.7056E−02 | 3.3994E−02 | −2.9105E−02 |
| R8 | 9.9000E+01 | −2.5196E−02 | −1.0218E−02 | 3.2383E−02 | −6.2520E−02 | 6.5580E−02 |
| R9 | −9.8800E+01 | −4.0964E−02 | −1.8182E−02 | 4.8882E−02 | −6.9214E−02 | 5.9119E−02 |
| R10 | −8.9011E+01 | −3.7322E−02 | −5.9915E−03 | 1.2423E−02 | −1.0971E−02 | 5.7460E−03 |
| R11 | −3.8934E+01 | 1.8363E−03 | −1.2156E−02 | 2.6982E−03 | 5.7126E−04 | −7.3893E−04 |
| R12 | −7.3943E+01 | −2.0340E−03 | −2.1749E−02 | 1.3661E−02 | −5.0315E−03 | 1.1181E−03 |
| R13 | −2.5077E+00 | −1.3345E−02 | −2.3881E−02 | 1.0282E−02 | −2.1323E−03 | 2.5912E−04 |

TABLE 2-continued

| | | | | | |
|---|---|---|---|---|---|
| R14 | 8.9900E−01 | 3.3411E−03 | −2.4784E−02 | 1.0312E−02 | −2.1650E−03 | 2.6234E−04 |
| R15 | −1.1179E+01 | −8.9632E−02 | 3.5334E−02 | −7.5659E−03 | 9.9691E−04 | −8.3594E−05 |
| R16 | −2.7864E+01 | −6.8374E−02 | 2.7116E−02 | −6.0941E−03 | 8.2470E−04 | −6.9597E−05 |

| | Conic coefficient | Aspherical coefficients | | | |
|---|---|---|---|---|---|
| | k | A14 | A16 | A18 | A20 |
| R1 | −1.2892E−01 | −3.4299E−03 | 1.0411E−03 | −1.7233E−04 | 1.1823E−05 |
| R2 | −1.5815E+01 | 9.4282E−03 | −2.4670E−03 | 3.6135E−04 | −2.2384E−05 |
| R3 | −1.6797E+00 | 1.4743E−02 | −4.1597E−03 | 6.4298E−04 | −4.1087E−05 |
| R4 | −2.2144E+00 | 2.5769E−02 | −1.0943E−02 | 2.7020E−03 | −2.9708E−04 |
| R5 | 1.5386E+01 | 4.6758E−02 | −2.0098E−02 | 4.8049E−03 | −4.8986E−04 |
| R6 | 5.7600E+01 | 9.4152E−03 | −2.1779E−03 | 4.3034E−05 | 5.3444E−05 |
| R7 | 2.7868E+01 | 1.5708E−02 | −4.9986E−03 | 8.0866E−04 | −4.7288E−05 |
| R8 | 9.9000E+01 | −4.1856E−02 | 1.6127E−02 | −3.4564E−03 | 3.1687E−04 |
| R9 | −9.8800E+01 | −3.2471E−02 | 1.1011E−02 | −2.0920E−03 | 1.6987E−04 |
| R10 | −8.9011E+01 | −1.9568E−03 | 4.2592E−04 | −5.1875E−05 | 2.6196E−06 |
| R11 | −3.8934E+01 | 2.3305E−04 | −3.3886E−05 | 2.3782E−06 | −6.5514E−08 |
| R12 | −7.3943E+01 | −1.4858E−04 | 1.1504E−05 | −4.7576E−07 | 8.0438E−09 |
| R13 | −2.5077E+00 | −1.8847E−05 | 7.8749E−08 | −1.6618E−08 | 1.1996E−10 |
| R14 | 8.9900E−01 | −1.9038E−05 | 8.1891E−07 | −1.9304E−08 | 1.9248E−10 |
| R15 | −1.1179E+01 | 4.4872E−06 | −1.4973E−07 | 2.8345E−09 | −2.3288E−11 |
| R16 | −2.7864E+01 | 3.6768E−06 | −1.1794E−07 | 2.0979E−09 | −1.5873E−11 |

In Table 2, k is a conic coefficient, and A4, A6, A8, A10, A12, A14, A16, A18 and A20 are aspherical coefficients.

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (1),$$

where x is a vertical distance between a point on an aspherical curve and the optic axis, and y is an aspherical depth (a vertical distance between a point on an aspherical surface, having a distance of x from the optic axis, and a surface tangent to a vertex of the aspherical surface on the optic axis).

In the present embodiment, an aspherical surface of each lens surface uses the aspherical surfaces shown in the above condition (1). However, the present disclosure is not limited to the aspherical polynomial form shown in the condition (1).

Table 3 and Table 4 show design data of inflexion points and arrest points of respective lens in the camera optical lens 10 according to Embodiment 1 of the present disclosure. P1R1 and P1R2 represent the object-side surface and the image-side surface of the first lens L1, respectively; P2R1 and P2R2 represent the object-side surface and the image-side surface of the second lens L2, respectively; P3R1 and P3R2 represent the object-side surface and the image-side surface of the third lens L3, respectively; P4R1 and P4R2 represent the object-side surface and the image-side surface of the fourth lens L4, respectively; P5R1 and P5R2 represent the object-side surface and the image-side surface of the fifth lens L5, respectively; P6R1 and P6R2 represent the object-side surface and the image-side surface of the sixth lens L6, respectively; P7R1 and P7R2 represent the object-side surface and the image-side surface of the seventh lens L7, respectively; P8R1 and P8R2 represent the object-side surface and the image-side surface of the eighth lens L8, respectively. The data in the column "inflexion point position" refers to vertical distances from inflexion points arranged on each lens surface to the optic axis of the camera optical lens 10. The data in the column "arrest point position" refers to vertical distances from arrest points arranged on each lens surface to the optic axis of the camera optical lens 10.

TABLE 3

| | Number of inflexion points | Inflexion point position 1 | Inflexion point position 2 | Inflexion point position 3 |
|---|---|---|---|---|
| P1R1 | 1 | 1.735 | / | / |
| P1R2 | 1 | 1.585 | / | / |
| P2R1 | 0 | / | / | / |
| P2R2 | 0 | / | / | / |
| P3R1 | 0 | / | / | / |
| P3R2 | 0 | / | / | / |
| P4R1 | 1 | 0.285 | / | / |
| P4R2 | 2 | 0.295 | 1.605 | / |
| P5R1 | 2 | 0.275 | 1.725 | / |
| P5R2 | 3 | 0.365 | 1.825 | 2.065 |
| P6R1 | 3 | 0.755 | 2.205 | 2.845 |
| P6R2 | 3 | 0.585 | 2.495 | 3.115 |
| P7R1 | 3 | 0.725 | 2.605 | 3.475 |
| P7R2 | 3 | 0.715 | 2.925 | 3.765 |
| P8R1 | 2 | 2.335 | 4.205 | / |
| P8R2 | 3 | 0.485 | 3.945 | 4.445 |

TABLE 4

| | Number of arrest points | Arrest point position 1 | Arrest point position 2 |
|---|---|---|---|
| P1R1 | 0 | / | / |
| P1R2 | 0 | / | / |
| P2R1 | 0 | / | / |
| P2R2 | 0 | / | / |
| P3R1 | 0 | / | / |
| P3R2 | 0 | / | / |
| P4R1 | 1 | 0.485 | / |
| P4R2 | 1 | 0.495 | / |
| P5R1 | 1 | 0.475 | / |
| P5R2 | 1 | 0.615 | / |
| P6R1 | 1 | 1.195 | / |
| P6R2 | 1 | 0.955 | / |
| P7R1 | 1 | 1.215 | / |
| P7R2 | 1 | 1.135 | / |
| P8R1 | 2 | 4.185 | 4.215 |
| P8R2 | 1 | 0.985 | / |

Figure 2:
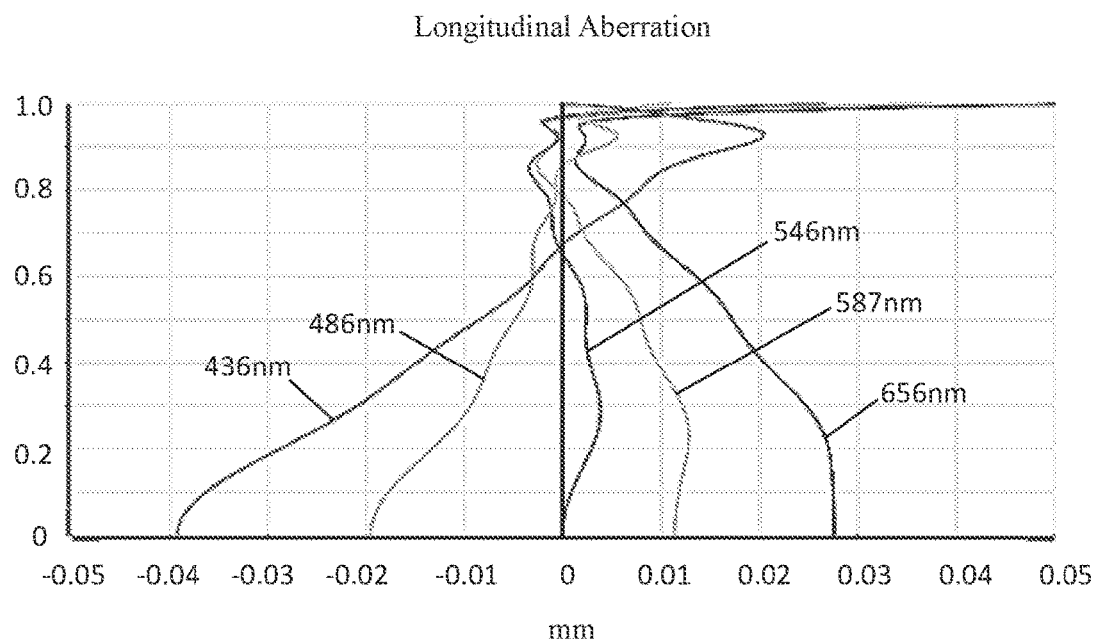
FIG. 2 is a schematic diagram of a longitudinal aberration of the camera optical lens shown in FIG. 1.
Figure 3:
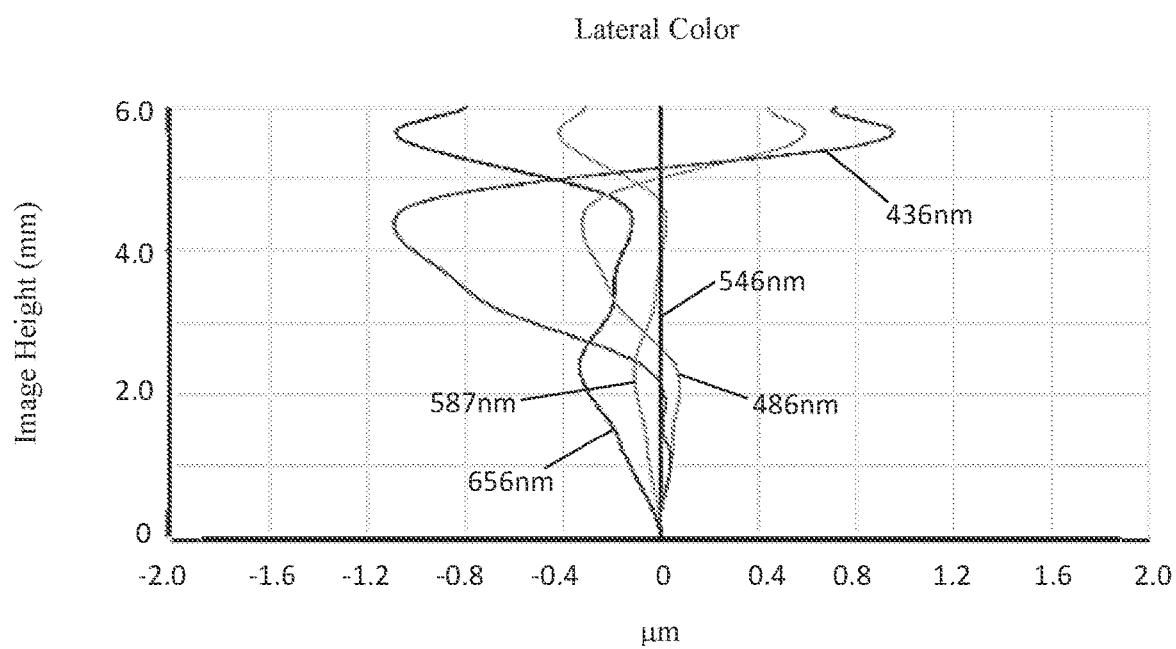
FIG. 3 is a schematic diagram of a lateral color of the camera optical lens shown in FIG. 1.
Figure 4:
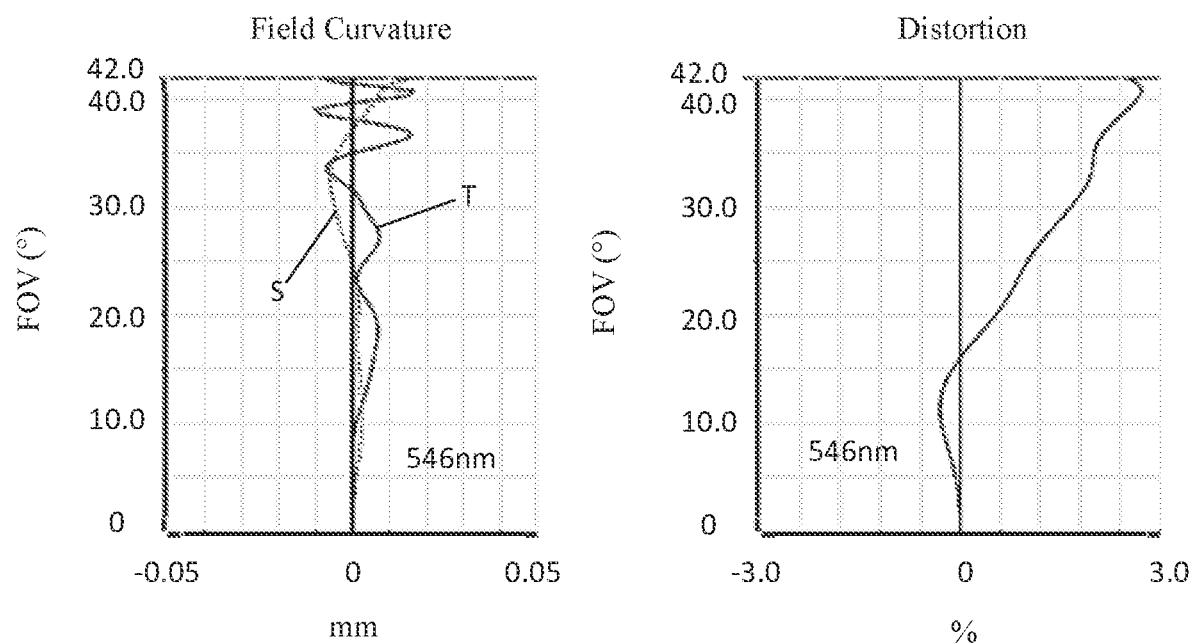
FIG. 4 is a schematic diagram of a field curvature and a distortion of the camera optical lens shown in FIG. 1.
Figure 5:
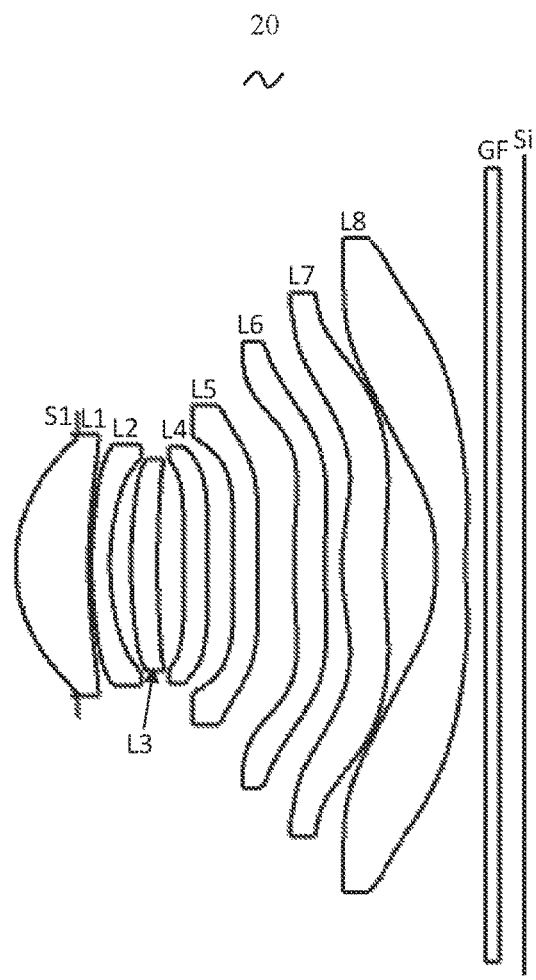
FIG. 5 is a schematic diagram of a structure of a camera optical lens in accordance with Embodiment 2 of the present disclosure.

FIG. 2 and FIG. 3 illustrate a longitudinal aberration and a lateral color of light with wavelengths of 656 nm, 587 nm, 546 nm, 486 nm, and 436 nm after passing the camera optical lens 10 according to Embodiment 1. FIG. 4 illustrates a field curvature and a distortion of light with a wavelength of 546 nm after passing the camera optical lens 10 according to Embodiment 1, in which a field curvature S is a field curvature in a sagittal direction and T is a field curvature in a tangential direction.

Table 13 below further lists various values of Embodiments 1, 2, 3 and 4 and values corresponding to parameters which are specified in the above conditions.

As shown in Table 17, Embodiment 1 satisfies the respective conditions.

In this embodiment, the entrance pupil diameter (ENPD) of the camera optical lens is 3.621 mm. The image height of IH is 6.016 mm. The field of view (FOV) along a diagonal direction is 84.00°. Thus, the camera optical lens 10 can provide an ultra-thin, wide-angle, large-aperture lens while having on-axis and off-axis aberrations sufficiently corrected, thereby leading to better optical characteristics.

Embodiment 2

Embodiment 2 is basically the same as Embodiment 1 and involves symbols having the same meanings as Embodiment 1. Only differences therebetween will be described in the following.

In this embodiment, the first lens L1 is made of a plastic material, and the fourth lens L4 has a negative refractive power.

Table 5 and Table 6 shows design data of a camera optical lens 20 in Embodiment 2 of the present disclosure.

TABLE 5

| | R | d | | nd | | vd |
|---|---|---|---|---|---|---|
| S1 | ∞ | d0= | −0.914 | | | |
| R1 | 2.437 | d1= | 1.070 | nd1 | 1.5444 | v1 | 55.82 |
| R2 | 8.315 | d2= | 0.048 | | | |
| R3 | 6.323 | d3= | 0.270 | nd2 | 1.6700 | v2 | 19.39 |
| R4 | 3.789 | d4= | 0.312 | | | |
| R5 | 7.206 | d5= | 0.398 | nd3 | 1.5444 | v3 | 55.82 |
| R6 | 12.648 | d6= | 0.392 | | | |
| R7 | 68.085 | d7= | 0.350 | nd4 | 1.6400 | v4 | 23.53 |
| R8 | 54.280 | d8= | 0.375 | | | |
| R9 | 18.983 | d9= | 0.361 | nd5 | 1.6153 | v5 | 25.94 |
| R10 | 14.658 | d10= | 0.551 | | | |
| R11 | 11.354 | d11= | 0.450 | nd6 | 1.5661 | v6 | 37.71 |
| R12 | 11.818 | d12= | 0.254 | | | |
| R13 | 3.731 | d13= | 0.635 | nd7 | 1.5444 | v7 | 55.82 |
| R14 | 8.750 | d14= | 0.759 | | | |
| R15 | −4.716 | d15= | 0.440 | nd8 | 1.5444 | v8 | 55.82 |
| R16 | 6.048 | d16= | 0.300 | | | |
| R17 | ∞ | d17= | 0.210 | ndg | 1.5170 | vg | 64.20 |
| R18 | ∞ | d18= | 0.365 | | | |

Table 6 shows aspherical data of respective lenses in the camera optical lens 20 according to Embodiment 2 of the present disclosure.

TABLE 6

| | Conic coefficient | Aspherical coefficients | | | | |
|---|---|---|---|---|---|---|
| | k | A4 | A6 | A8 | A10 | A12 |
| R1 | −1.2876E−01 | 8.7511E−04 | 3.4255E−04 | 4.4563E−04 | −1.0666E−03 | 9.6726E−04 |
| R2 | −4.0311E+01 | −1.5700E−02 | 3.1025E−02 | −3.0419E−02 | 1.9493E−02 | −8.4796E−03 |
| R3 | −2.8822E+00 | −3.1967E−02 | 4.3264E−02 | −3.9047E−02 | 2.6400E−02 | −1.2411E−02 |
| R4 | −2.9642E+00 | −6.0119E−03 | 1.8373E−02 | −1.2376E−02 | 6.3388E−03 | −1.0481E−03 |
| R5 | 1.4606E+01 | −1.1374E−02 | 2.9229E−03 | −5.3899E−03 | 6.8436E−03 | −5.3040E−03 |
| R6 | 5.9025E+01 | −1.0999E−02 | 6.8279E−04 | 4.1974E−05 | −5.7709E−03 | 1.0674E−02 |
| R7 | −8.0510E+01 | −2.1629E−02 | −3.0978E−03 | 3.4588E−03 | −1.0675E−02 | 1.2523E−02 |
| R8 | 4.5935E+01 | −2.0759E−02 | −9.5871E−03 | 2.4860E−02 | −3.9333E−02 | 3.4744E−02 |
| R9 | −9.0804E+01 | −3.2584E−02 | −1.1585E−02 | 2.8148E−02 | −3.2175E−02 | 2.1790E−02 |
| R10 | −8.3746E+01 | −3.0513E−02 | −4.8213E−03 | 8.8750E−03 | −6.4365E−03 | 2.7004E−03 |
| R11 | −9.0269E+01 | 7.4915E−03 | −1.4769E−02 | 5.5908E−03 | −1.3204E−03 | 3.8898E−05 |
| R12 | −8.9496E+01 | −7.8628E−03 | −1.6510E−02 | 1.1017E−02 | −3.9798E−03 | 8.3705E−04 |
| R13 | −3.1735E+00 | −2.3562E−02 | −1.2997E−02 | 6.0696E−03 | −1.2912E−03 | 1.6681E−04 |
| R14 | 5.2142E−02 | −2.8714E−03 | −1.5296E−02 | 6.3657E−03 | −1.3211E−03 | 1.6007E−04 |
| R15 | −1.5890E+01 | −8.9473E−02 | 3.5597E−02 | −7.3453E−03 | 9.1416E−04 | −7.2043E−05 |
| R16 | −6.0540E+01 | −5.4531E−02 | 1.9664E−02 | −3.9489E−03 | 4.8044E−04 | −3.6881E−05 |
| | Conic coefficient | Aspherical coefficients | | | | |
| | k | A14 | A16 | A18 | A20 | |
| R1 | −1.2876E−01 | −4.9426E−04 | 1.4498E−04 | −2.3254E−05 | 1.5374E−06 | |
| R2 | −4.0311E+01 | 2.4550E−03 | −4.5200E−04 | 4.7488E−05 | −2.1442E−06 | |
| R3 | −2.8822E+00 | 3.9576E−03 | −8.0232E−04 | 9.2204E−05 | −4.5225E−06 | |
| R4 | −2.9642E+00 | −3.9197E−04 | 1.8222E−04 | 9.0619E−06 | −9.1516E−06 | |
| R5 | 1.4606E+01 | 2.7692E−03 | −8.5971E−04 | 1.5284E−04 | −1.1756E−05 | |
| R6 | 5.9025E+01 | −9.2482E−03 | 4.4494E−03 | −1.1356E−03 | 1.2112E−04 | |
| R7 | −8.0510E+01 | −8.6068E−03 | 3.5109E−03 | −7.8882E−04 | 7.3938E−05 | |
| R8 | 4.5935E+01 | −1.8802E−02 | 6.1553E−03 | −1.1209E−03 | 8.7181E−05 | |
| R9 | −9.0804E+01 | −9.5104E−03 | 2.5860E−03 | −3.9768E−04 | 2.6350E−05 | |
| R10 | −8.3746E+01 | −7.2288E−04 | 1.2355E−04 | −1.1999E−05 | 4.9158E−07 | |
| R11 | −9.0269E+01 | 4.5017E−05 | −8.6244E−06 | 6.3227E−07 | −1.6978E−08 | |
| R12 | −8.9496E+01 | −1.0364E−04 | 7.4313E−06 | −2.8449E−07 | 4.4705E−09 | |
| R13 | −3.1735E+00 | −1.3604E−05 | 6.8417E−07 | −1.9402E−08 | 2.3746E−10 | |
| R14 | 5.2142E−02 | −1.1846E−05 | 5.3102E−07 | −1.3314E−08 | 1.4369E−10 | |
| R15 | −1.5890E+01 | 3.6344E−06 | −1.1411E−07 | 2.0349E−09 | −1.5761E−11 | |
| R16 | −6.0540E+01 | 1.7900E−06 | −5.3084E−08 | 8.7587E−10 | −6.1537E−12 | |

Table 7 and Table 8 show design data of inflexion points and arrest points of respective lens in the camera optical lens 20 according to Embodiment 2 of the present disclosure.

TABLE 7

|  | Number of inflexion points | Inflexion point position 1 | Inflexion point position 2 | Inflexion point position 3 | Inflexion point position 4 |
|---|---|---|---|---|---|
| P1R1 | 1 | 1.805 | / | / | / |
| P1R2 | 1 | 1.475 | / | / | / |
| P2R1 | 0 | / | / | / | / |
| P2R2 | 0 | / | / | / | / |
| P3R1 | 0 | / | / | / | / |
| P3R2 | 0 | / | / | / | / |
| P4R1 | 1 | 0.245 | / | / | / |
| P4R2 | 2 | 0.265 | 1.735 | / | / |
| P5R1 | 2 | 0.355 | 1.905 | / | / |
| P5R2 | 3 | 0.415 | 1.995 | 2.245 | / |
| P6R1 | 3 | 0.775 | 2.315 | 2.985 | / |
| P6R2 | 3 | 0.575 | 2.445 | 3.235 | / |
| P7R1 | 3 | 0.755 | 2.655 | 3.665 | / |
| P7R2 | 4 | 0.765 | 3.145 | 4.015 | 4.125 |
| P8R1 | 4 | 1.685 | 2.365 | 2.515 | 4.315 |
| P8R2 | 3 | 0.455 | 4.015 | 4.525 | / |

TABLE 8

|  | Number of arrest points | Arrest point position 1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 0 | / |
| P4R1 | 1 | 0.405 |
| P4R2 | 1 | 0.455 |
| P5R1 | 1 | 0.605 |
| P5R2 | 1 | 0.705 |
| P6R1 | 1 | 1.225 |
| P6R2 | 1 | 0.965 |
| P7R1 | 1 | 1.325 |
| P7R2 | 1 | 1.275 |
| P8R1 | 0 | / |
| P8R2 | 1 | 0.875 |

Figure 6:
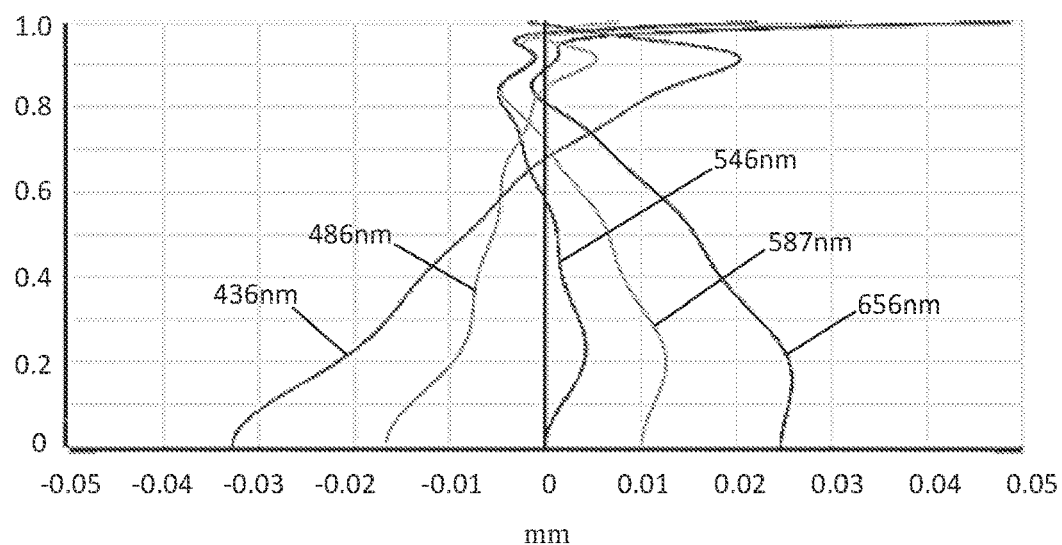
FIG. 6 is a schematic diagram of a longitudinal aberration of the camera optical lens shown in FIG. 5.
Figure 7:
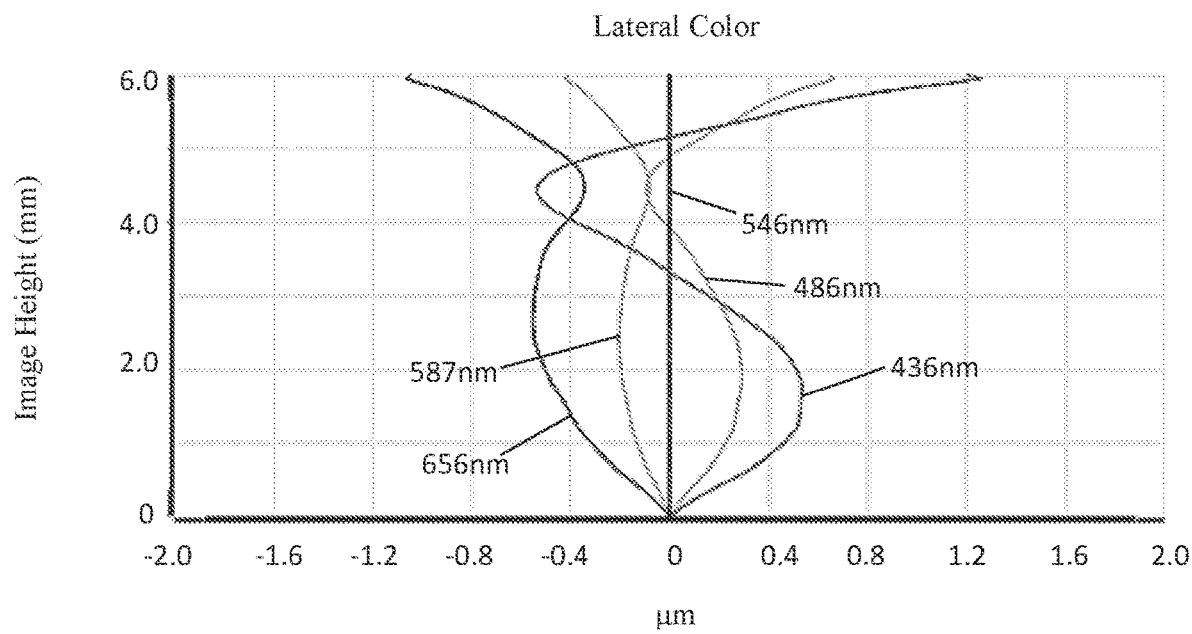
FIG. 7 is a schematic diagram of a lateral color of the camera optical lens shown in FIG. 5.
Figure 8:
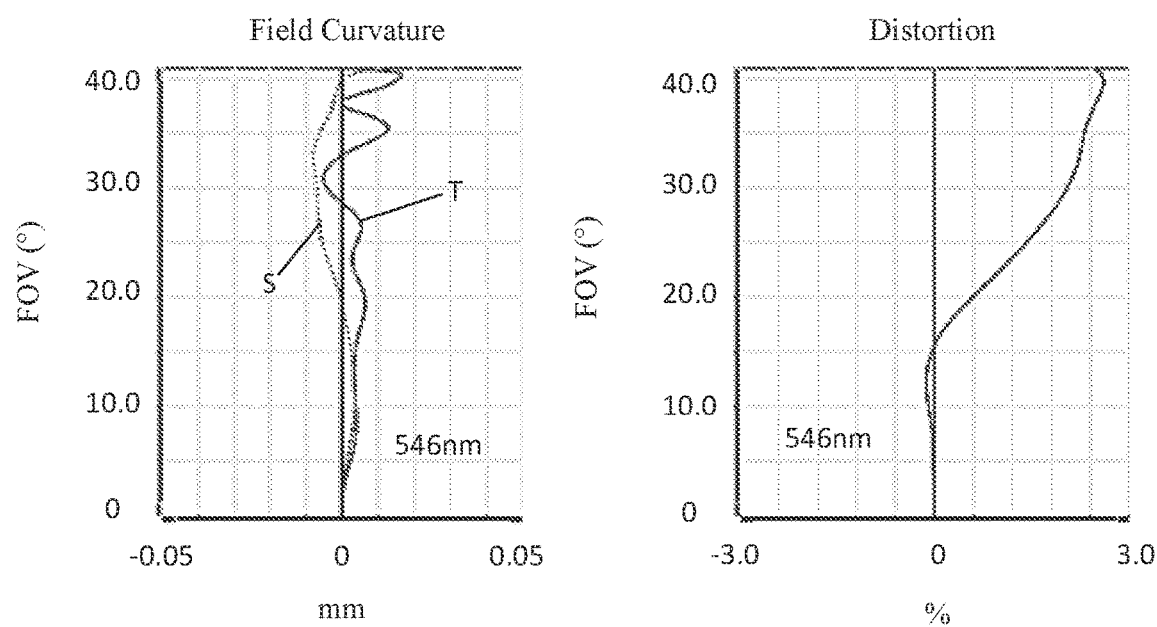
FIG. 8 is a schematic diagram of a field curvature and a distortion of the camera optical lens shown in FIG. 5.
Figure 9:
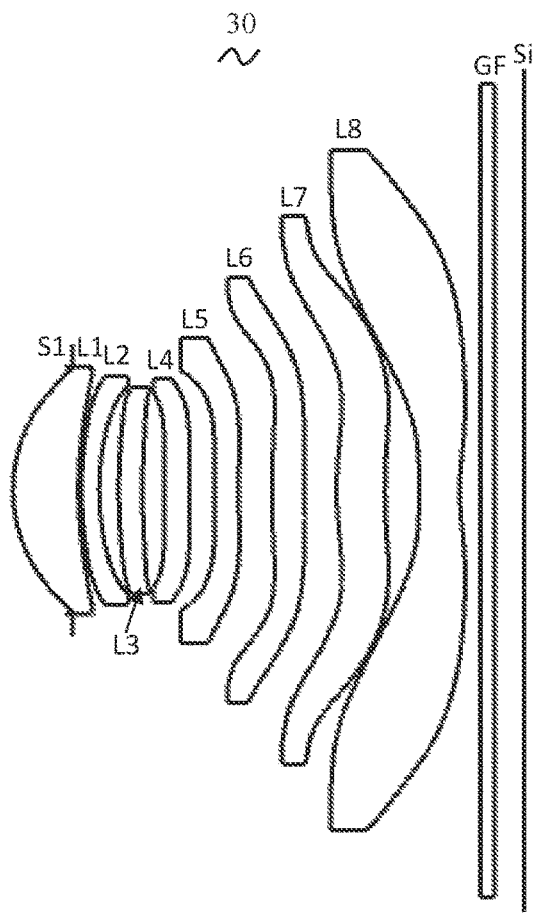
FIG. 9 is a schematic diagram of a structure of a camera optical lens in accordance with Embodiment 3 of the present disclosure.

FIG. 6 and FIG. 7 illustrate a longitudinal aberration and a lateral color of light with wavelengths of 656 nm, 587 nm, 546 nm, 486 nm, and 436 nm after passing the camera optical lens 20 according to Embodiment 2. FIG. 8 illustrates a field curvature and a distortion of light with a wavelength of 546 nm after passing the camera optical lens 20 according to Embodiment 2.

As shown in Table 17, Embodiment 2 satisfies the respective conditions.

In this embodiment, the entrance pupil diameter (ENPD) of the camera optical lens is 3.974 mm. The image height of IH is 6.016 mm. The field of view (FOV) along a diagonal direction is 80.00°. Thus, the camera optical lens 20 can provide an ultra-thin, wide-angle, large-aperture lens while having on-axis and off-axis aberrations sufficiently corrected, thereby leading to better optical characteristics.

Embodiment 3

Embodiment 3 is basically the same as Embodiment 1 and involves symbols having the same meanings as Embodiment 1. Only differences therebetween will be described in the following.

Table 9 and Table 10 shows design data of a camera optical lens 30 in Embodiment 3 of the present disclosure.

TABLE 9

|  | R |  | d | nd |  | vd |  |
|---|---|---|---|---|---|---|---|
| S1 | ∞ | d0= | −0.866 |  |  |  |  |
| R1 | 2.274 | d1= | 0.947 | nd1 | 1.5267 | v1 | 76.60 |
| R2 | 6.057 | d2= | 0.042 |  |  |  |  |
| R3 | 5.135 | d3= | 0.260 | nd2 | 1.6700 | v2 | 19.39 |
| R4 | 3.993 | d4= | 0.283 |  |  |  |  |
| R5 | 8.469 | d5= | 0.344 | nd3 | 1.5444 | v3 | 55.82 |
| R6 | 10.809 | d6= | 0.314 |  |  |  |  |
| R7 | 36.054 | d7= | 0.367 | nd4 | 1.5661 | v4 | 37.71 |
| R8 | 64.568 | d8= | 0.359 |  |  |  |  |
| R9 | 24.321 | d9= | 0.352 | nd5 | 1.6153 | v5 | 25.94 |
| R10 | 11.616 | d10= | 0.481 |  |  |  |  |
| R11 | 12.448 | d11= | 0.471 | nd6 | 1.5661 | v6 | 37.70 |
| R12 | 3074.188 | d12= | 0.454 |  |  |  |  |
| R13 | 5.045 | d13= | 0.701 | nd7 | 1.5346 | v7 | 55.69 |
| R14 | 7.553 | d14= | 0.497 |  |  |  |  |
| R15 | −14.314 | d15= | 0.586 | nd8 | 1.5444 | v8 | 55.82 |
| R16 | 3.757 | d16= | 0.300 |  |  |  |  |
| R17 | ∞ | d17= | 0.210 | ndg | 1.5170 | vg | 64.20 |
| R18 | ∞ | d18= | 0.414 |  |  |  |  |

Table 10 shows aspherical data of respective lenses in the camera optical lens 30 according to Embodiment 3 of the present disclosure.

TABLE 10

|  | Conic coefficient | Aspherical coefficients | | | | |
|---|---|---|---|---|---|---|
|  | k | A4 | A6 | A8 | A10 | A12 |
| R1 | −1.2049E−01 | 1.5056E−03 | −5.5664E−04 | 3.2057E−03 | −5.2320E−03 | 4.7065E−03 |
| R2 | −2.3677E+01 | −1.4744E−02 | 3.2234E−02 | −3.3422E−02 | 2.5493E−02 | −1.4419E−02 |
| R3 | 3.9820E−01 | −2.9979E−02 | 3.8670E−02 | −3.1993E−02 | 2.1468E−02 | −1.0308E−02 |
| R4 | −1.3657E+00 | −5.1480E−03 | 1.8203E−02 | −1.9462E−02 | 2.6862E−02 | −2.8728E−02 |
| R5 | 1.3914E+01 | −1.5351E−02 | 8.1518E−03 | −2.0484E−02 | 3.8575E−02 | −4.3368E−02 |
| R6 | 4.6581E+01 | −1.6857E−02 | −3.6054E−03 | 1.4352E−02 | −3.4209E−02 | 4.9062E−02 |
| R7 | 9.9000E+01 | −2.6767E−02 | 4.9909E−03 | −2.2727E−02 | 3.0573E−02 | −2.9757E−02 |
| R8 | 9.9000E+01 | −2.4800E−02 | −4.4223E−03 | 1.6337E−02 | −3.5949E−02 | 3.8532E−02 |
| R9 | −9.8647E+01 | −4.7323E−02 | −8.2154E−03 | 4.0153E−02 | −6.0956E−02 | 5.1666E−02 |
| R10 | −9.0354E+01 | −4.1537E−02 | 7.1902E−03 | −2.7581E−03 | 1.3121E−03 | −7.8625E−04 |
| R11 | −1.4860E+01 | −3.0981E−03 | −6.1950E−03 | 2.4846E−04 | 1.0727E−03 | −6.6433E−04 |
| R12 | 9.9000E+01 | −8.9668E−04 | −1.4591E−02 | 9.1225E−03 | −3.1725E−03 | 6.3620E−04 |
| R13 | −3.3290E+00 | −1.2404E−02 | −1.8042E−02 | 7.3169E−03 | −1.4480E−03 | 1.7325E−04 |
| R14 | −3.1415E+01 | 4.1309E−03 | −1.8714E−02 | 6.6260E−03 | −1.1978E−03 | 1.2671E−04 |

TABLE 10-continued

| | | | | | |
|---|---|---|---|---|---|
| R15 | −7.8026E+00 | −7.7692E−02 | 2.7106E−02 | −5.1873E−03 | 6.1910E−04 | −4.7551E−05 |
| R16 | −1.9212E+01 | −5.0229E−02 | 1.6774E−02 | −3.1358E−03 | 3.5452E−04 | −2.5232E−05 |

| | Conic coefficient | Aspherical coefficients | | | |
|---|---|---|---|---|---|
| | k | A14 | A16 | A18 | A20 |
| R1 | −1.2049E−01 | −2.5048E−03 | 7.8046E−04 | −1.3225E−04 | 9.2915E−06 |
| R2 | −2.3677E+01 | 5.7118E−03 | −1.4603E−03 | 2.1087E−04 | −1.2785E−05 |
| R3 | 3.9820E−01 | 3.3128E−03 | −5.7521E−04 | 2.3532E−05 | 4.1884E−06 |
| R4 | −1.3657E+00 | 2.1304E−02 | −9.8539E−03 | 2.5942E−03 | −2.9602E−04 |
| R5 | 1.3914E+01 | 3.0880E−02 | −1.3272E−02 | 3.1915E−03 | −3.2689E−04 |
| R6 | 4.6581E+00 | −4.1869E−02 | 2.1261E−02 | −5.9071E−03 | 6.9532E−04 |
| R7 | 9.9000E+01 | 1.9269E−02 | −7.8480E−03 | 1.8040E−03 | −1.8110E−04 |
| R8 | 9.9000E+01 | −2.4774E−02 | 9.6262E−03 | −2.0876E−03 | 1.9437E−04 |
| R9 | −9.8647E+01 | −2.7178E−02 | 8.6830E−03 | −1.5390E−03 | 1.1567E−04 |
| R10 | −9.0354E+01 | 3.1741E−04 | −6.6315E−05 | 6.8379E−06 | −2.8412E−07 |
| R11 | −1.4860E+01 | 1.7517E−04 | −2.3059E−05 | 1.5027E−06 | −3.8861E−08 |
| R12 | 9.9000E+01 | −7.3401E−05 | 4.6607E−06 | −1.4061E−07 | 1.2241E−09 |
| R13 | −3.3290E+00 | −1.2947E−05 | 5.9047E−07 | −1.5036E−08 | 1.6334E−10 |
| R14 | −3.1415E+01 | −8.1389E−06 | 3.1588E−07 | −6.9235E−09 | 6.6998E−11 |
| R15 | −7.8026E+00 | 2.3560E−06 | −7.2937E−08 | 1.2851E−09 | −9.8452E−12 |
| R16 | −1.9212E+01 | 1.1330E−06 | −3.1042E−08 | 4.7266E−10 | −3.0599E−12 |

Table 11 and Table 12 show design data of inflexion points and arrest points of respective lens in the camera optical lens 30 according to Embodiment 3 of the present disclosure.

TABLE 11

| | Number of inflexion points | Inflexion point position 1 | Inflexion point position 2 | Inflexion point position 3 |
|---|---|---|---|---|
| P1R1 | 1 | 1.755 | / | / |
| P1R2 | 2 | 1.545 | 1.705 | / |
| P2R1 | 0 | / | / | / |
| P2R2 | 0 | / | / | / |
| P3R1 | 0 | / | / | / |
| P3R2 | 0 | / | / | / |
| P4R1 | 1 | 0.305 | / | / |
| P4R2 | 2 | 0.235 | 1.605 | / |
| P5R1 | 1 | 0.265 | / | / |
| P5R2 | 3 | 0.405 | 1.905 | 2.145 |
| P6R1 | 2 | 0.765 | 2.275 | / |
| P6R2 | 3 | 0.135 | 2.805 | 3.125 |
| P7R1 | 3 | 0.745 | 2.645 | 3.585 |
| P7R2 | 3 | 0.745 | 3.045 | 3.875 |
| P8R1 | 1 | 2.345 | / | / |
| P8R2 | 1 | 0.585 | / | / |

TABLE 12

| | Number of arrest points | Arrest point position 1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 0 | / |
| P4R1 | 1 | 0.515 |
| P4R2 | 1 | 0.395 |
| P5R1 | 1 | 0.465 |
| P5R2 | 1 | 0.705 |
| P6R1 | 1 | 1.205 |
| P6R2 | 1 | 0.215 |
| P7R1 | 1 | 1.245 |
| P7R2 | 1 | 1.225 |
| P8R1 | 0 | / |
| P8R2 | 1 | 1.305 |

Figure 10:
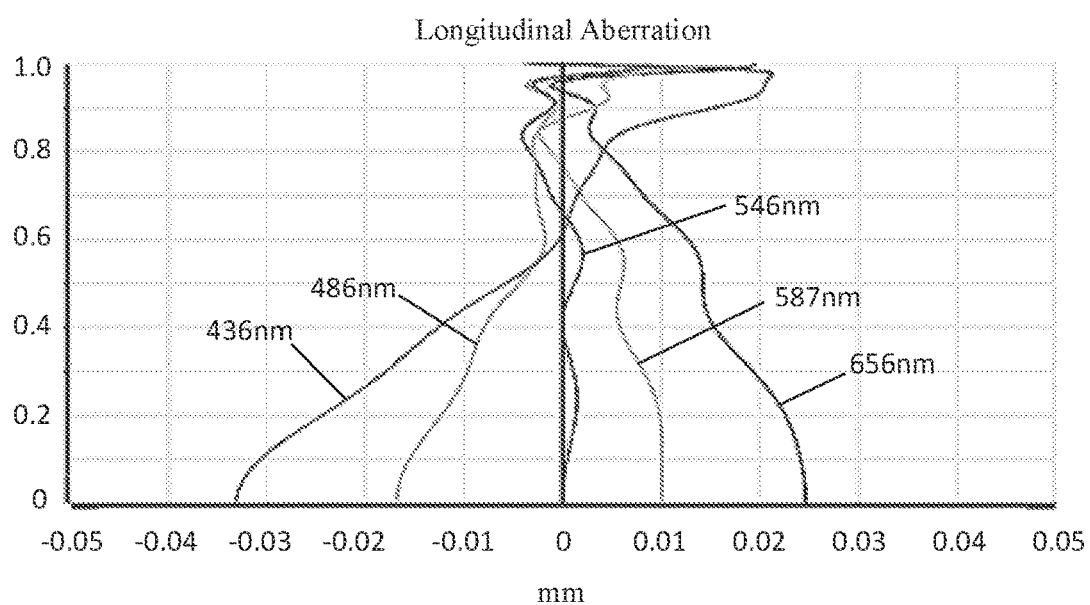
FIG. 10 is a schematic diagram of a longitudinal aberration of the camera optical lens shown in FIG. 9.
Figure 11:
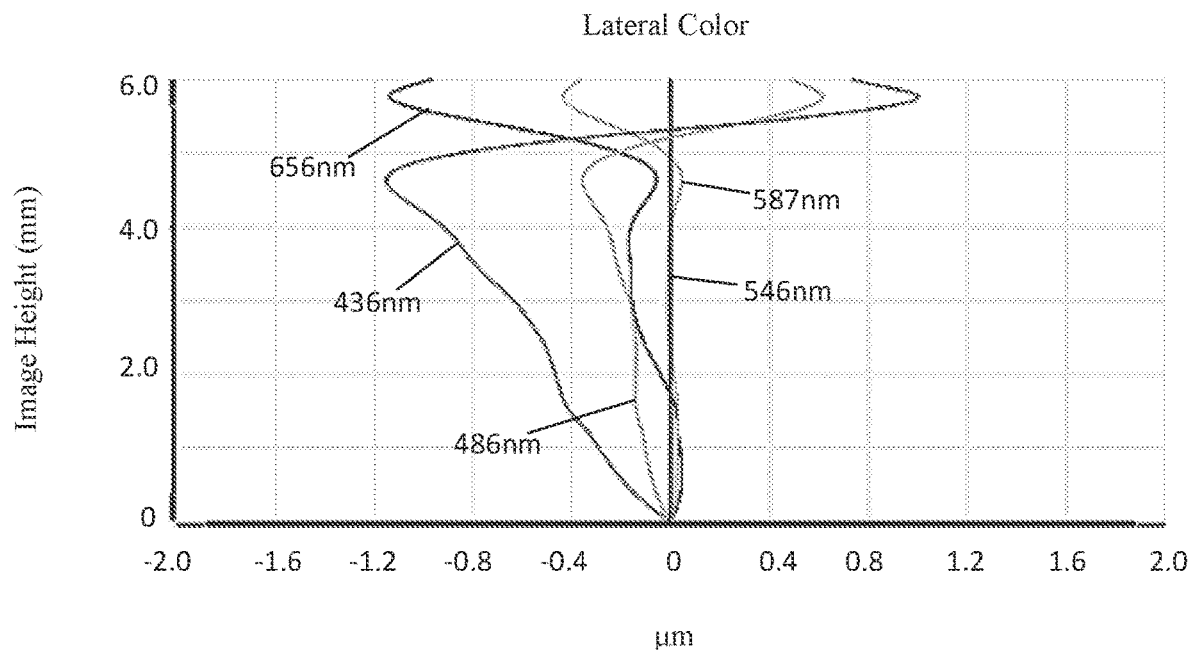
FIG. 11 is a schematic diagram of a lateral color of the camera optical lens shown in FIG. 9.
Figure 12:
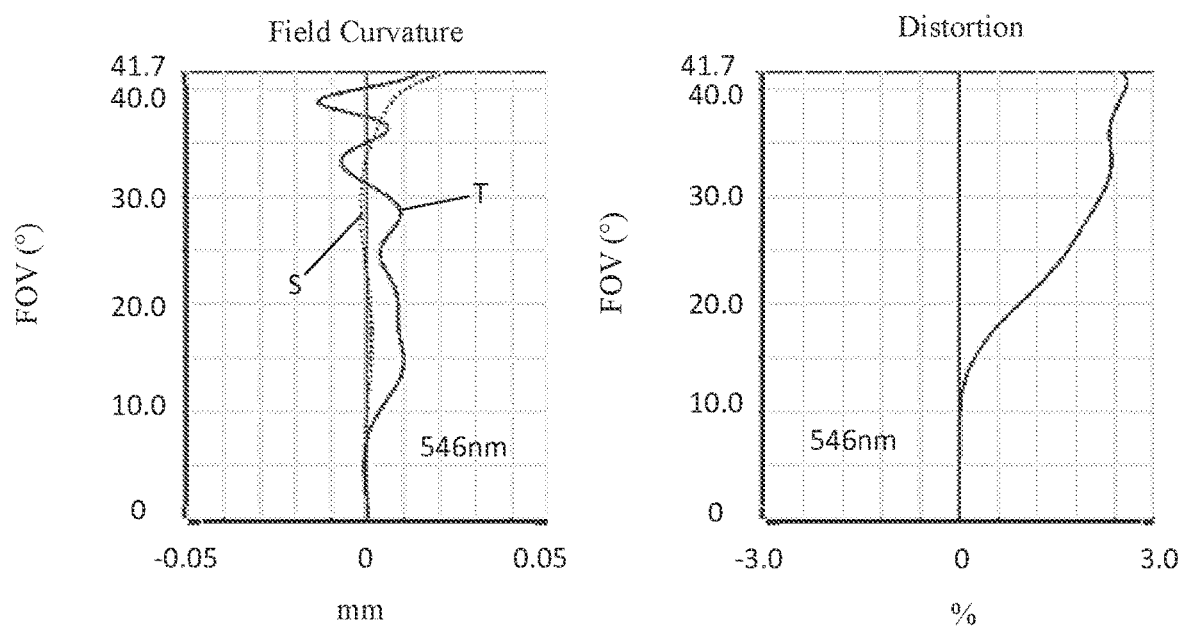
FIG. 12 is a schematic diagram of a field curvature and a distortion of the camera optical lens shown in FIG. 9.
Figure 13:
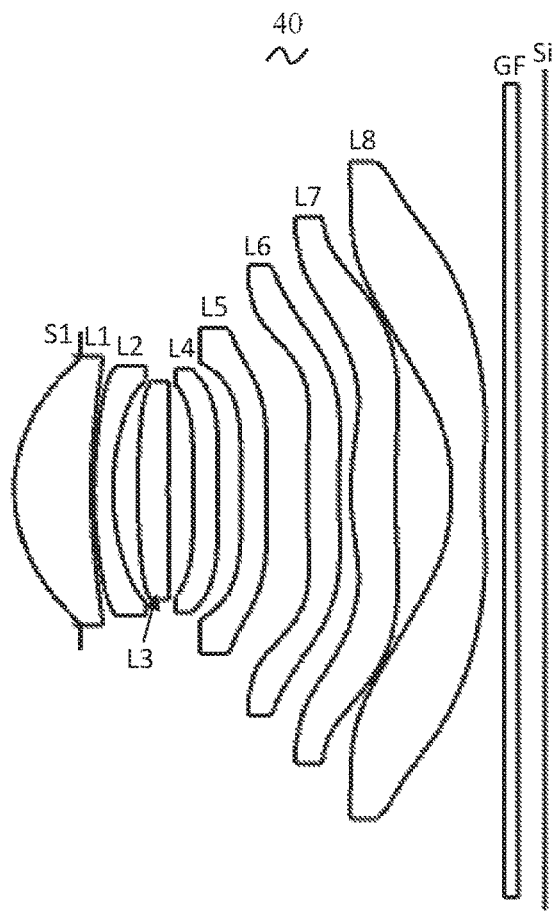
FIG. 13 is a schematic diagram of a structure of a camera optical lens in accordance with Embodiment 4 of the present disclosure.

FIG. 10 and FIG. 11 illustrate a longitudinal aberration and a lateral color of light with wavelengths of 656 nm, 587 nm, 546 nm, 486 nm, and 436 nm after passing the camera optical lens 30 according to Embodiment 3. FIG. 12 illustrates field curvature and distortion of light with a wavelength of 546 nm after passing the camera optical lens 30 according to Embodiment 3.

Table 17 below further lists various values of the present embodiment and values corresponding to parameters which are specified in the above conditions. Obviously, the camera optical lens according to this embodiment satisfies the above conditions.

In this embodiment, the entrance pupil diameter (ENPD) of the camera optical lens is 3.662 mm. The image height of IH is 6.016 mm. The field of view (FOV) along a diagonal direction is 83.40°. Thus, the camera optical lens 30 can provide an ultra-thin, wide-angle, large-aperture lens while having on-axis and off-axis aberrations sufficiently corrected, thereby leading to better optical characteristics.

Embodiment 4

Embodiment 4 is basically the same as Embodiment 1 and involves symbols having the same meanings as Embodiment 1. Only differences therebetween will be described in the following. In this embodiment, the first lens L1 is made of a plastic material, the fourth lens L4 has a negative refractive power, the sixth lens L6 has a negative refractive power, and the object-side surface of the fourth lens L4 is concave at the paraxial region.

Table 9 and Table 10 shows design data of a camera optical lens 40 in Embodiment 4 of the present disclosure.

TABLE 13

| | R | d | | nd | | vd |
|---|---|---|---|---|---|---|
| S1 | ∞ | d0= | −0.932 | | | |
| R1 | 2.450 | d1= | 1.087 | nd1 | 1.5444 | v1 | 55.82 |
| R2 | 9.692 | d2= | 0.040 | | | |
| R3 | 6.126 | d3= | 0.270 | nd2 | 1.6700 | v2 | 19.39 |
| R4 | 3.644 | d4= | 0.350 | | | |
| R5 | 10.306 | d5= | 0.437 | nd3 | 1.5444 | v3 | 55.82 |
| R6 | 50.601 | d6= | 0.357 | | | |
| R7 | −64.407 | d7= | 0.350 | nd4 | 1.6400 | v4 | 23.53 |

TABLE 13-continued

| | R | d | | nd | | vd |
|---|---|---|---|---|---|---|
| R8 | 594.182 | d8= | 0.324 | | | |
| R9 | 41.236 | d9= | 0.366 | nd5 | 1.6153 | v5 | 25.94 |
| R10 | 22.443 | d10= | 0.578 | | | |
| R11 | 17.612 | d11= | 0.450 | nd6 | 1.5661 | v6 | 37.71 |
| R12 | 16.844 | d12= | 0.169 | | | |
| R13 | 4.009 | d13= | 0.630 | nd7 | 1.5444 | v7 | 55.82 |
| R14 | 12.626 | d14= | 0.798 | | | |
| R15 | −4.979 | d15= | 0.445 | nd8 | 1.5444 | v8 | 55.82 |

TABLE 13-continued

| | R | d | | nd | | vd |
|---|---|---|---|---|---|---|
| R16 | 4.845 | d16= | 0.300 | | | |
| R17 | ∞ | d17= | 0.210 | ndg | 1.5170 | vg | 64.20 |
| R18 | ∞ | d18= | 0.380 | | | |

Table 14 shows aspherical data of respective lenses in the camera optical lens 40 according to Embodiment 4 of the present disclosure.

TABLE 14

| | Conic coefficient | Aspherical coefficients | | | | |
|---|---|---|---|---|---|---|
| | k | A4 | A6 | A8 | A10 | A12 |
| R1 | −1.1258E−01 | 1.3224E−03 | −1.2885E−03 | 3.6904E−03 | −4.5290E−03 | 3.2214E−03 |
| R2 | −4.2869E+01 | −1.5223E−02 | 3.2442E−02 | −3.3115E−02 | 2.2489E−02 | −1.0382E−02 |
| R3 | −3.7751E+00 | −3.0932E−02 | 4.0842E−02 | −3.9313E−02 | 2.8418E−02 | −1.4182E−02 |
| R4 | −3.2079E+00 | −5.6199E−03 | 1.6162E−02 | −1.6217E−02 | 1.6807E−02 | −1.3330E−02 |
| R5 | 2.6799E+01 | −5.7492E−03 | 3.4723E−03 | −9.4118E−03 | 1.3827E−02 | −1.2372E−02 |
| R6 | 8.1858E+01 | −4.9764E−03 | −6.1368E−03 | 1.7918E−02 | −3.3968E−02 | 3.8732E−02 |
| R7 | −7.8963E+01 | −2.1082E−02 | −5.4840E−03 | 3.5453E−03 | −1.0422E−02 | 1.3334E−02 |
| R8 | 9.9000E+01 | −1.8773E−02 | −1.2965E−02 | 3.1865E−02 | −5.1259E−02 | 4.6447E−02 |
| R9 | 1.6925E+01 | −3.9111E−02 | 4.9726E−04 | 9.6327E−03 | −1.3156E−02 | 9.1183E−03 |
| R10 | −9.4002E+01 | −3.8986E−02 | 5.6695E−03 | −2.9745E−03 | 2.6060E−03 | −1.6853E−03 |
| R11 | −6.6792E+01 | 3.5687E−03 | −1.1895E−02 | 1.9037E−03 | 8.7254E−04 | −7.0922E−04 |
| R12 | −7.3726E+01 | −8.8066E−03 | −1.9194E−02 | 1.1554E−02 | −3.8121E−03 | 7.5847E−04 |
| R13 | −3.4537E+00 | −1.9673E−02 | −1.5630E−02 | 6.8899E−03 | −1.3817E−03 | 1.6151E−04 |
| R14 | 2.9068E+00 | 6.1122E−03 | −1.6566E−02 | 6.5825E−03 | −1.4359E−03 | 1.8850E−04 |
| R15 | −1.1733E+01 | −8.6546E−02 | 3.5079E−02 | −7.5909E−03 | 9.9793E−04 | −8.2929E−05 |
| R16 | −3.6147E+01 | −5.6579E−02 | 1.9972E−02 | −4.1295E−03 | 5.2578E−04 | −4.2343E−05 |

| | Conic coefficient | Aspherical coefficients | | | |
|---|---|---|---|---|---|
| | k | A14 | A16 | A18 | A20 |
| R1 | −1.1258E−01 | −1.3970E−03 | 3.6240E−04 | −5.1869E−05 | 3.1031E−06 |
| R2 | −4.2869E+01 | 3.1911E−03 | −6.2330E−04 | 6.9393E−05 | −3.3191E−06 |
| R3 | −3.7751E+00 | 4.7772E−03 | −1.0234E−03 | 1.2498E−04 | −6.5716E−06 |
| R4 | −3.2079E+00 | 7.9056E−03 | −3.1149E−03 | 7.2338E−04 | −7.3788E−05 |
| R5 | 2.6799E+01 | 7.2403E−03 | −2.5670E−03 | 5.1347E−04 | −4.3783E−05 |
| R6 | 8.1858E+01 | −2.6751E−02 | 1.1160E−02 | −2.5826E−03 | 2.5627E−04 |
| R7 | −7.8963E+01 | −1.0078E−02 | 4.5207E−03 | −1.1102E−03 | 1.1330E−04 |
| R8 | 9.9000E+01 | −2.5743E−02 | 8.6182E−03 | −1.6016E−03 | 1.2686E−04 |
| R9 | 1.6925E+01 | −4.2990E−03 | 1.3093E−03 | −2.2601E−04 | 1.6599E−05 |
| R10 | −9.4002E+01 | 5.8341E−04 | −1.0322E−04 | 8.9312E−06 | −3.0162E−07 |
| R11 | −6.6792E+01 | 1.9729E−04 | −2.6541E−05 | 1.7504E−06 | −4.5604E−08 |
| R12 | −7.3726E+01 | −9.0122E−05 | 6.1753E−06 | −2.2127E−07 | 3.1143E−09 |
| R13 | −3.4537E+00 | −1.1426E−05 | 4.7829E−07 | −1.0795E−08 | 9.9279E−11 |
| R14 | 2.9068E+00 | −1.5297E−05 | 7.5489E−07 | −2.0803E−08 | 2.4551E−10 |
| R15 | −1.1733E+01 | 4.3942E−06 | −1.4433E−07 | 2.6825E−09 | −2.1592E−11 |
| R16 | −3.6147E+01 | 2.1493E−06 | −6.6329E−08 | 1.1333E−09 | −8.2113E−12 |

Table 15 and Table 16 show design data of inflexion points and arrest points of respective lens in the camera optical lens 40 according to Embodiment 4 of the present disclosure.

TABLE 15

|  | Number of inflexion points | Inflexion point position 1 | Inflexion point position 2 | Inflexion point position 3 |
|---|---|---|---|---|
| P1R1 | 1 | 1.825 | / | / |
| P1R2 | 1 | 1.575 | / | / |
| P2R1 | 0 | / | / | / |
| P2R2 | 0 | / | / | / |
| P3R1 | 0 | / | / | / |
| P3R2 | 2 | 0.525 | 1.175 | / |
| P4R1 | 0 | / | / | / |
| P4R2 | 2 | 0.095 | 1.715 | / |
| P5R1 | 2 | 0.235 | 1.885 | / |
| P5R2 | 3 | 0.315 | 1.875 | 2.225 |
| P6R1 | 3 | 0.705 | 2.245 | 2.905 |
| P6R2 | 3 | 0.505 | 2.375 | 3.185 |
| P7R1 | 3 | 0.755 | 2.725 | 3.615 |
| P7R2 | 3 | 0.815 | 3.145 | 3.955 |
| P8R1 | 2 | 2.465 | 4.205 | / |
| P8R2 | 3 | 0.495 | 3.935 | 4.475 |

TABLE 16

|  | Number of arrest points | Arrest point position 1 | Arrest point position 2 |
|---|---|---|---|
| P1R1 | 0 | / | / |
| P1R2 | 0 | / | / |
| P2R1 | 0 | / | / |
| P2R2 | 0 | / | / |
| P3R1 | 0 | / | / |
| P3R2 | 2 | 0.875 | 1.315 |
| P4R1 | 0 | / | / |
| P4R2 | 1 | 0.145 | / |
| P5R1 | 1 | 0.395 | / |
| P5R2 | 1 | 0.545 | / |
| P6R1 | 1 | 1.075 | / |
| P6R2 | 1 | 0.825 | / |
| P7R1 | 1 | 1.295 | / |
| P7R2 | 1 | 1.315 | / |
| P8R1 | 0 | / | / |
| P8R2 | 1 | 0.985 | / |

Figure 14:
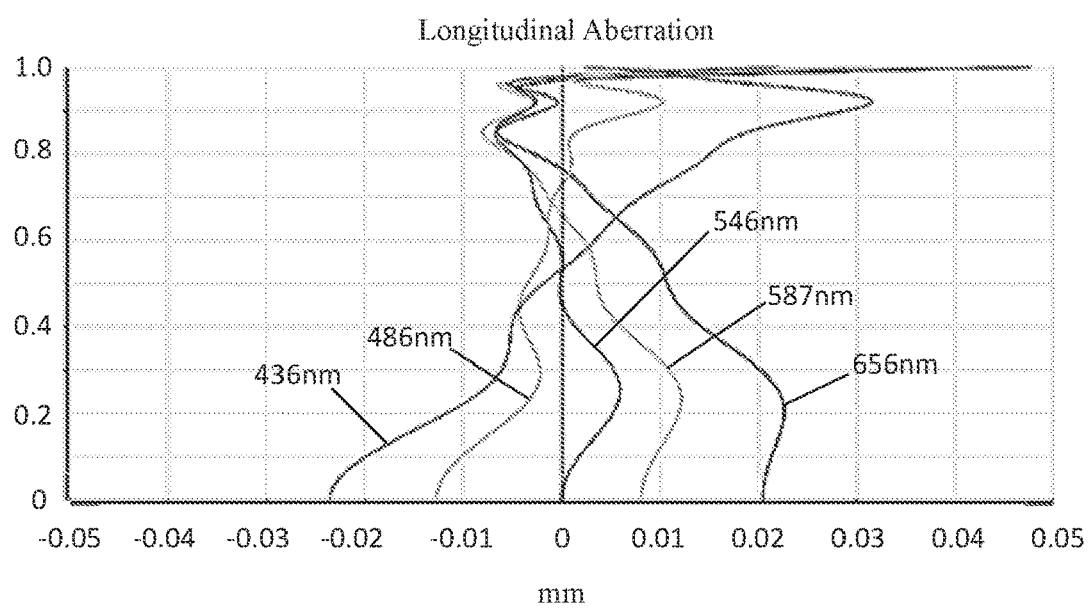
FIG. 14 is a schematic diagram of a longitudinal aberration of the camera optical lens shown in FIG. 13.
Figure 15:
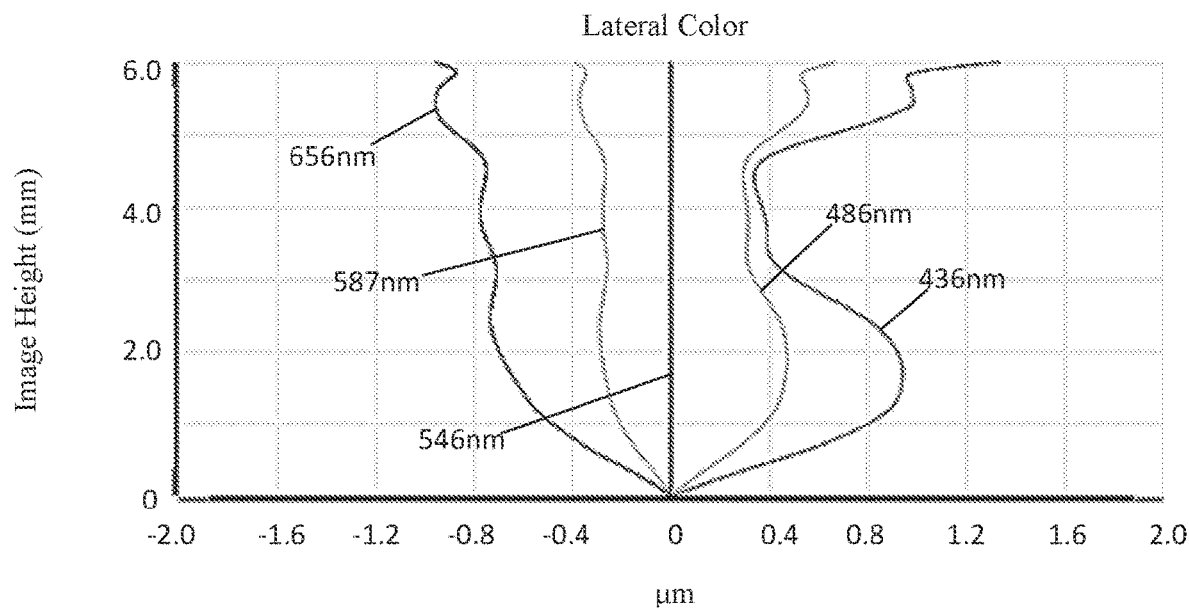
FIG. 15 is a schematic diagram of a lateral color of the camera optical lens shown in FIG. 13.
Figure 16:
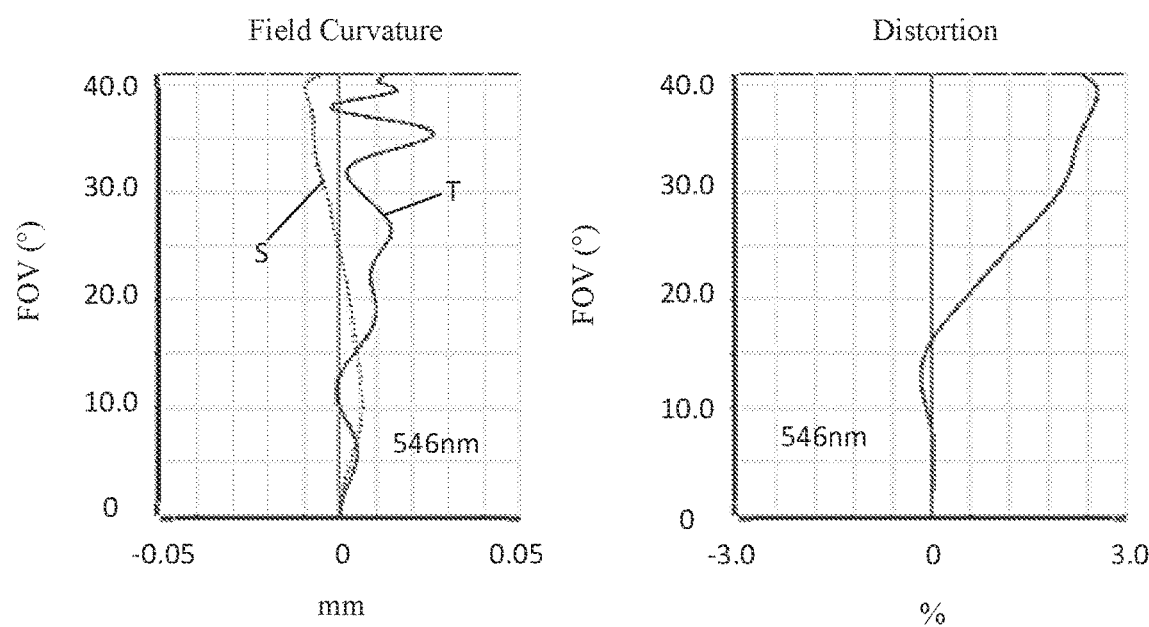
FIG. 16 is a schematic diagram of a field curvature and a distortion of the camera optical lens shown in FIG. 13.

FIG. 14 and FIG. 15 illustrate a longitudinal aberration and a lateral color of light with wavelengths of 656 nm, 587 nm, 546 nm, 486 nm, and 436 nm after passing the camera optical lens 40 according to Embodiment 4. FIG. 16 illustrates field curvature and distortion of light with a wavelength of 546 nm after passing the camera optical lens 40 according to Embodiment 3.

Table 17 below further lists various values of the present embodiment and values corresponding to parameters which are specified in the above conditions. Obviously, the camera optical lens according to this embodiment satisfies the above conditions.

In this embodiment, the entrance pupil diameter (ENPD) of the camera optical lens is 3.980 mm. The image height of IH is 6.016 mm. The FOV (field of view) along a diagonal direction is 80.00°. Thus, the camera optical lens 40 can provide an ultra-thin, wide-angle, large-aperture lens while having on-axis and off-axis aberrations sufficiently corrected, thereby leading to better optical characteristics.

TABLE 17

| Parameters and Conditions | Embodiment 1 | Embodiment 2 | Embodiment 3 | Embodiment 4 |
|---|---|---|---|---|
| f7/f | 2.32 | 1.69 | 3.91 | 1.55 |
| R6/R5 | 1.69 | 1.76 | 1.28 | 4.91 |
| d10/d12 | 1.59 | 2.17 | 1.06 | 3.42 |
| f | 6.518 | 6.756 | 6.592 | 6.767 |
| f1 | 6.749 | 5.924 | 6.343 | 5.695 |
| f2 | −28.626 | −14.565 | −29.150 | −13.870 |
| f3 | 29.474 | 29.860 | 68.046 | 23.580 |
| f4 | 2285.364 | −418.266 | 142.647 | −89.872 |
| f5 | −71.550 | −107.034 | −36.194 | −79.907 |
| f6 | 52.712 | 375.618 | 21.940 | −861.187 |
| f7 | 15.101 | 11.389 | 25.775 | 10.474 |
| f8 | −4.651 | −4.778 | −5.382 | −4.421 |
| f12 | 8.125 | 8.604 | 7.539 | 8.293 |
| FNO | 1.80 | 1.70 | 1.80 | 1.70 |
| TTL | 7.192 | 7.540 | 7.382 | 7.541 |
| FOV | 84.00 | 80.00 | 83.40 | 80.00 |
| IH | 6.016 | 6.016 | 6.016 | 6.016 |

It can be appreciated by one having ordinary skill in the art that the description above is only embodiments of the present disclosure. In practice, one having ordinary skill in the art can make various modifications to these embodiments in forms and details without departing from the spirit and scope of the present disclosure.

What is claimed is:

1. A camera optical lens, comprising, from an object side to an image side:
   a first lens having a positive refractive power;
   a second lens having a negative refractive power;
   a third lens having a positive refractive power;
   a fourth lens;
   a fifth lens having a negative refractive power;
   a sixth lens;
   a seventh lens having a positive refractive power; and
   an eighth lens having a negative refractive power,
   wherein the sixth lens includes an object-side surface being convex in a paraxial region,
   wherein the camera optical lens satisfies:

$-4.50 \leq f2/f \leq -2.00$;

$1.50 \leq f7/f \leq 4.00$;

$1.97 \leq (R3+R4)/(R3-R4) \leq 13.97$;

$1.20 \leq R6/R5 \leq 5.00$;

$-10.05 \leq (R13+R14)/(R13-R14) \leq -1.29$; and $1.00 \leq d10/d12 \leq 3.50$, where f denotes a focal length of the camera optical lens; f2 denotes a focal length of the second lens; f7 denotes a focal length of the seventh lens; R3 denotes a curvature radius of an object-side surface of the second lens; R4 denotes a curvature radius of an image-side surface of the second lens; R5 denotes a curvature radius of an object-side surface of the third lens; R6 denotes a curvature radius of an image-side surface of the third lens; R13 denotes a curvature radius of the object-side surface of the seventh lens; R14 denotes a curvature radius of an image-side surface of the seventh lens; d10 denotes an on-axis distance from an image-side surface of the fifth lens to an object-side surface of the sixth lens; and d12 denotes an on-axis distance from an image-side surface of the sixth lens to an object-side surface of the seventh lens.

2. The camera optical lens as described in claim 1, wherein the camera optical lens satisfies:

$$0.42 \leq f1/f \leq 1.55;$$

$$-5.02 \leq (R1+R2)/(R1-R2) \leq -1.12; \text{ and}$$

$$0.06 \leq d1/TTL \leq 0.22,$$

where f1 denotes a focal length of the first lens; R1 denotes a curvature radius of an object-side surface of the first lens; R2 denotes a curvature radius of an image-side surface of the first lens; d1 denotes an on-axis thickness of the first lens; and TTL denotes a total optical length from the object-side surface of the first lens to an image plane of the camera optical lens along an optic axis.

3. The camera optical lens as described in claim 1, wherein the camera optical lens satisfies:

$$0.02 \leq d3/TTL \leq 0.05,$$

where d3 denotes an on-axis thickness of the second lens; and TTL denotes a total optical length from an object-side surface of the first lens to an image plane of the camera optical lens along an optic axis.

4. The camera optical lens as described in claim 1, wherein the camera optical lens satisfies:

$$1.74 \leq f3/f \leq 15.48;$$

$$-16.48 \leq (R5+R6)/(R5-R6) \leq -1.01; \text{ and}$$

$$0.02 \leq d5/TTL \leq 0.09,$$

where f3 denotes a focal length of the third lens; d5 denotes an on-axis thickness of the third lens; and TTL denotes a total optical length from an object-side surface of the first lens to an image plane of the camera optical lens along an optic axis.

5. The camera optical lens as described in claim 1, wherein the camera optical lens satisfies:

$$-123.82 \leq f4/f \leq 525.94;$$

$$-152.84 \leq (R7+R8)/(R7-R8) \leq 13.30; \text{ and}$$

$$0.02 \leq d7/TTL \leq 0.07,$$

where f4 denotes a focal length of the fourth lens; R7 denotes a curvature radius of an object-side surface of the fourth lens; R8 denotes a curvature radius of an image-side surface of the fourth lens; d7 denotes an on-axis thickness of the fourth lens; and TTL denotes a total optical length from an object-side surface of the first lens to an image plane of the camera optical lens along an optic axis.

6. The camera optical lens as described in claim 1, wherein the camera optical lens satisfies:

$$-31.69 \leq f5/f \leq -3.66;$$

$$1.41 \leq (R9+R10)/(R9-R10) \leq 11.67; \text{ and}$$

$$0.02 \leq d9/TTL \leq 0.07,$$

where f5 denotes a focal length of the fifth lens; R9 denotes a curvature radius of an object-side surface of the fifth lens; R10 denotes a curvature radius of the image-side surface of the fifth lens; d9 denotes an on-axis thickness of the fifth lens; and TTL denotes a total optical length from an object-side surface of the first lens to an image plane of the camera optical lens along an optic axis.

7. The camera optical lens as described in claim 1, wherein the camera optical lens satisfies:

$$-254.53 \leq f6/f \leq 83.40;$$

$$-99.88 \leq (R11+R12)/(R11-R12) \leq 67.30; \text{ and}$$

$$0.03 \leq d11/TTL \leq 0.10,$$

where f6 denotes a focal length of the sixth lens; R11 denotes a curvature radius of the object-side surface of the sixth lens; R12 denotes a curvature radius of the image-side surface of the sixth lens; d11 denotes an on-axis thickness of the sixth lens; and TTL denotes a total optical length from an object-side surface of the first lens to an image plane of the camera optical lens along an optic axis.

8. The camera optical lens as described in claim 1, wherein the camera optical lens satisfies:

$$0.04 \leq d13/TTL \leq 0.14,$$

where d13 denotes an on-axis thickness of the seventh lens; and TTL denotes a total optical length from an object-side surface of the first lens to an image plane of the camera optical lens along an optic axis.

9. The camera optical lens as described in claim 1, wherein the camera optical lens satisfies:

$$-1.63 \leq f8/f \leq -0.44;$$

$$-0.25 \leq (R15+R16)/(R15-R16) \leq 0.88; \text{ and}$$

$$0.03 \leq d15/TTL \leq 0.12,$$

where f8 denotes a focal length of the eighth lens; R15 denotes a curvature radius of an object-side surface of the eighth lens; R16 denotes a curvature radius of an image-side surface of the eighth lens; d15 denotes an on-axis thickness of the eighth lens; and TTL denotes a total optical length from an object-side surface of the first lens to an image plane of the camera optical lens along an optic axis.

10. The camera optical lens as described in claim 1, wherein the first lens is made of a glass material.

* * * * *